(12) United States Patent
Aoki et al.

(10) Patent No.: US 6,304,212 B1
(45) Date of Patent: Oct. 16, 2001

(54) POSITION DATA DISPLAY/CONTROL APPARATUS AND METHODS

(75) Inventors: Nobuhiro Aoki; Masayoshi Okuyama, both of Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/218,283

(22) Filed: Dec. 22, 1998

(30) Foreign Application Priority Data

Dec. 24, 1997 (JP) .................................................... 9-355804
Dec. 24, 1997 (JP) .................................................... 9-366517
Dec. 24, 1997 (JP) .................................................... 9-366518

(51) Int. Cl.[7] ........................................................ G01S 5/14
(52) U.S. Cl. ...................................... 342/357.13; 701/208
(58) Field of Search ........................ 342/357.13; 701/208

(56) References Cited

U.S. PATENT DOCUMENTS 5,546,092 * 8/1996 Kurokawa et al. ............. 342/357.06
5,596,500 * 1/1997 Sprague et al. .................... 701/213
6,047,236 * 4/2000 Hancock et al. ................... 701/208

* cited by examiner

*Primary Examiner*—Gregory C. Issing
(74) *Attorney, Agent, or Firm*—Frishauf, Holtz, Goodman, Langer & Chick, P.C.

(57) ABSTRACT

The present invention relates to a position data/display control apparatus and method which uses received position data to display data on the present position. A user selects the nearest area to the user's present position, as determined from received position data, from a storage means which stores a plurality of area names and data for measurement of positions in areas corresponding to the area names. Upon selection, the present position data is converted to position data suitable for measurement of the user's present position based on the data for measurement of a position in an area corresponding to the selected area name. The converted position data is then displayed to the user. Advantageously, a user's present position is displayed relative to the geodetic system in the area corresponding to the selected area name.

9 Claims, 16 Drawing Sheets

| NO. | CITY NAME | TIME DIFF. | LAT., LONG. | GEODETIC SYSTEM |
|---|---|---|---|---|
| 1 | HONOLULU | GMT-10H | 21°21'00"N 157°56'00"W | HAWAI |
| ⋮ | ⋮ | ⋮ | ⋮ | ⋮ |
| 10 | NEW YORK | GMT-5H | 40°46'00"N 73°54'00"W | NOR.AME.1927 NOR.AME.1983 |
| ⋮ | ⋮ | ⋮ | ⋮ | ⋮ |
| 25 | TOKYO | GMT+9H | 35°40'40"N 139°46'14"E | TOKYO |
| ⋮ | ⋮ | ⋮ | ⋮ | ⋮ |
| SATELLITE ORBIT DATA | | | | |

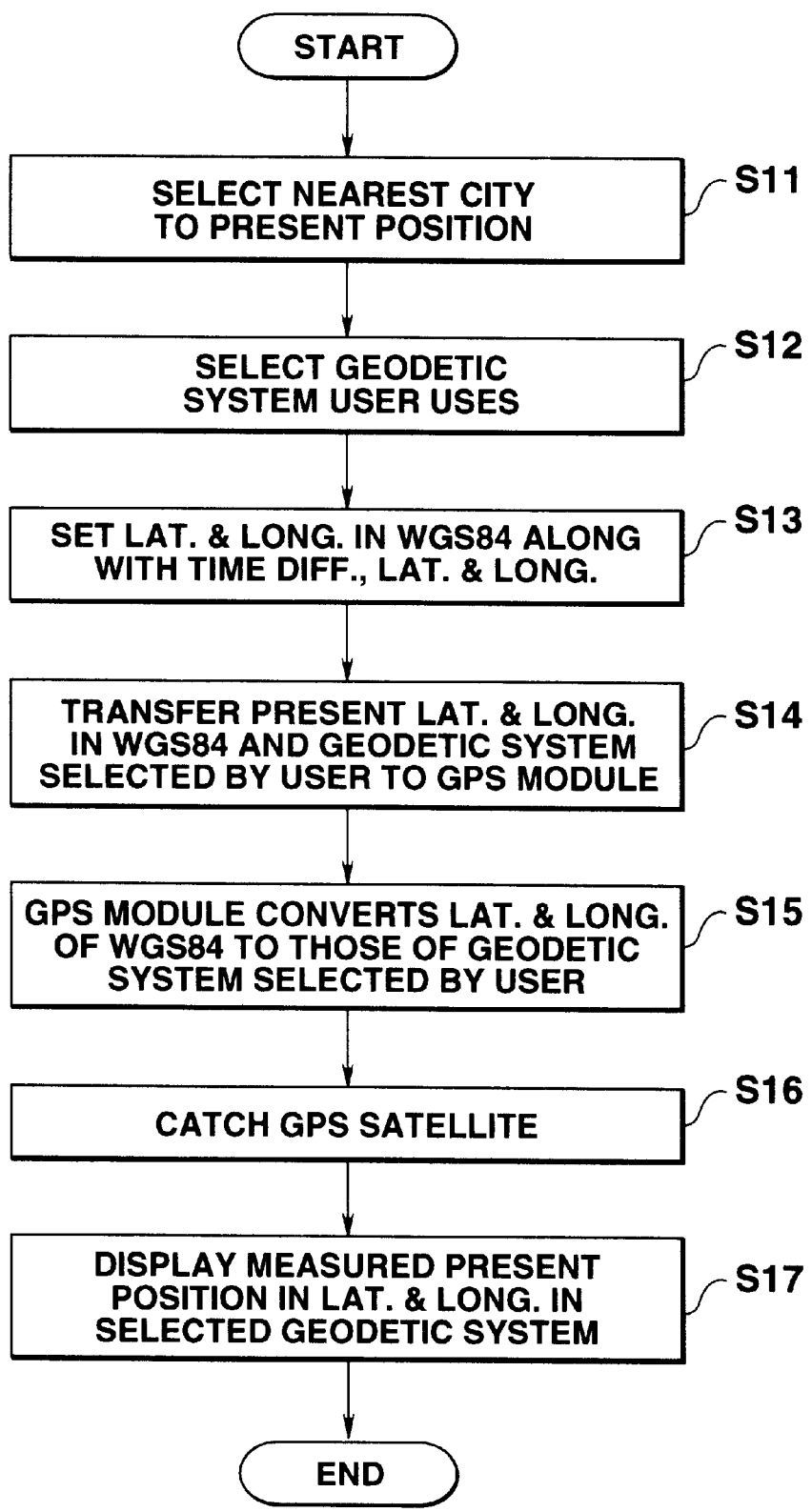

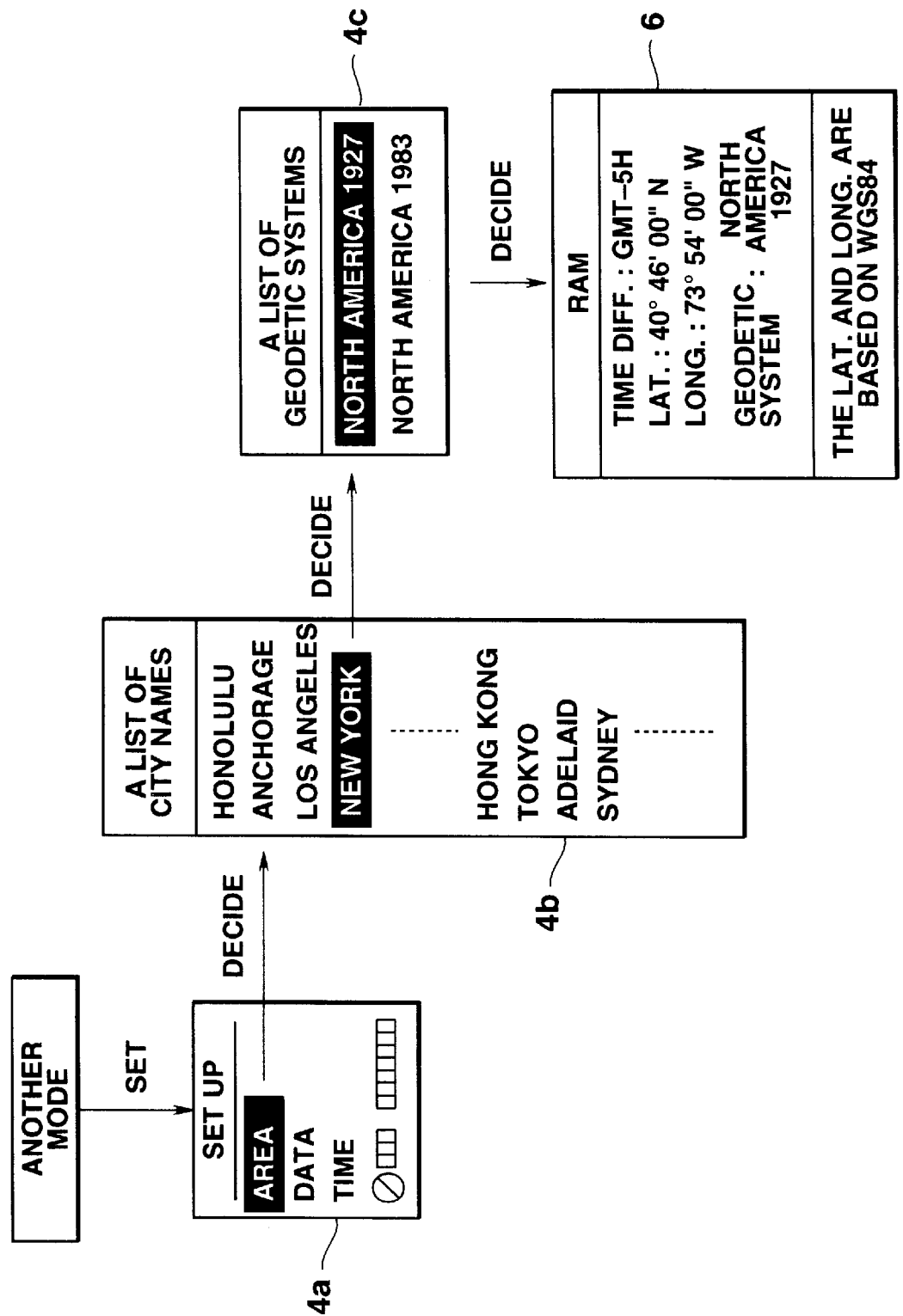

5 LEVEL1 MAPS

8 LEVEL2 MAPS

23 LEVEL3 MAPS

FIG.15

REDUCE ←――――→ ENLARGE

| NO. \ LEVEL | LEVEL0 | LEVEL1 | LEVEL2 | LEVEL3 | LEVEL4 |
|---|---|---|---|---|---|
| 1 | 0-01 | 1-01 | 2-01 | 3-01 | 4-01 |
| 2 | 0-01 | 1-01 | 2-01 | 3-01 | 4-02 |
| 3 | 0-01 | 1-01 | 2-01 | 3-02 | 4-03 |
| 4 | 0-01 | 1-01 | 2-01 | 3-02 | 4-04 |
| 5 | 0-01 | 1-01 | 2-01 | 3-02 | 4-05 |
| 6 | 0-01 | 1-01 | 2-02 | 3-03 | 4-06 |
| 7 | 0-01 | 1-01 | 2-02 | 3-04 | 4-07 |
| 8 | 0-01 | 1-02 | 2-02 | 3-04 | 4-08 |
| 9 | 0-01 | 1-02 | 2-02 | 3-04 | 4-09 |
| 10 | 0-01 | 1-03 | 2-03 | 3-05 | 4-10 |
| 11 | 0-01 | 1-03 | 2-03 | 3-06 | 4-11 |
| 12 | 0-01 | 1-03 | 2-04 | 3-07 | 4-12 |
| 13 | 0-01 | 1-03 | 2-04 | 3-07 | 4-13 |
| 14 | 0-01 | 1-03 | 2-03 | 3-06 | 4-14 |
| 15 | 0-01 | 1-03 | 2-04 | 3-08 | 4-15 |
| 16 | 0-01 | 1-03 | 2-04 | 3-07 | 4-16 |
| 17 | 0-01 | 1-04 | 2-05 | 3-09 | 4-17 |
| 18 | 0-01 | 1-03 | 2-04 | 3-08 | 4-18 |
| 19 | 0-01 | 1-04 | 2-05 | 3-09 | 4-19 |
| 20 | 0-01 | 1-04 | 2-05 | 3-09 | 4-20 |
| 21 | 0-01 | 1-04 | 2-06 | 3-10 | 4-21 |
| 22 | 0-01 | 1-04 | 2-06 | 3-10 | 4-22 |
| 23 | 0-01 | 1-05 | 2-07 | 3-11 | 4-23 |
| 24 | 0-01 | 1-05 | 2-07 | 3-12 | 4-24 |
| 25 | 0-01 | 1-05 | 2-08 | 3-13 | 4-25 |

LEVEL0 (0-01)

LEVEL1 (1-01)

LEVEL2 (2-01)

LEVEL3 (3-01)

LEVEL4 (4-01)

D (PRESENT POSITION)

FIG.19
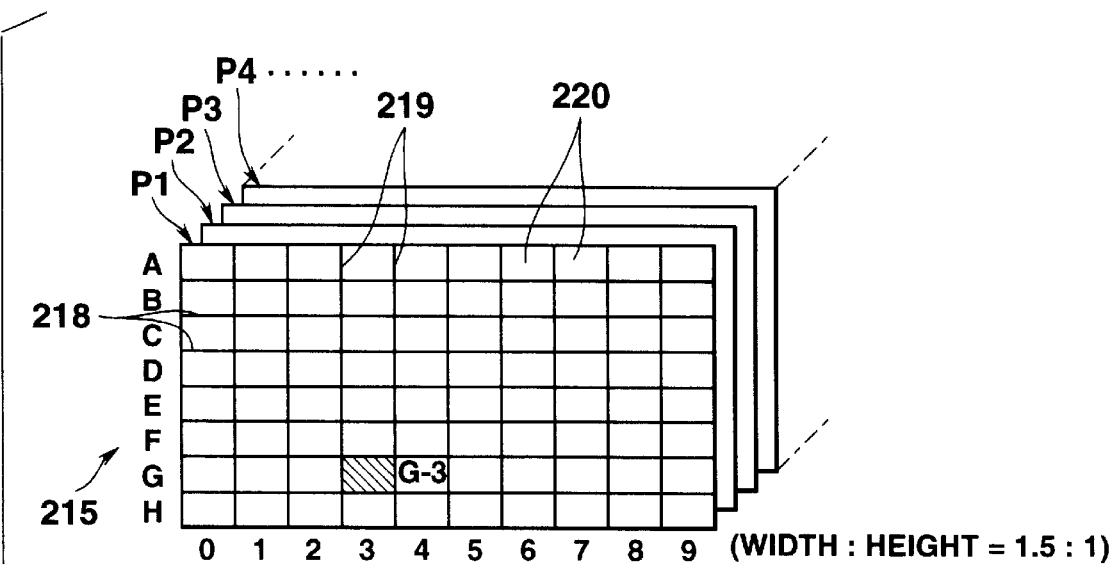
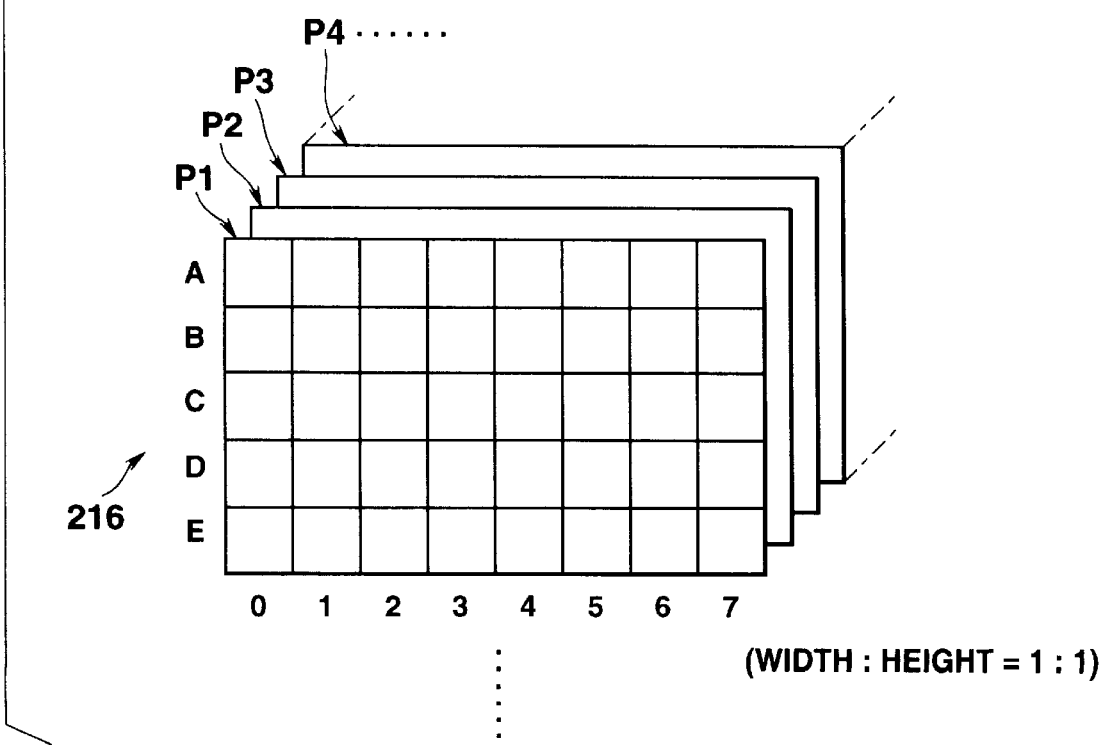

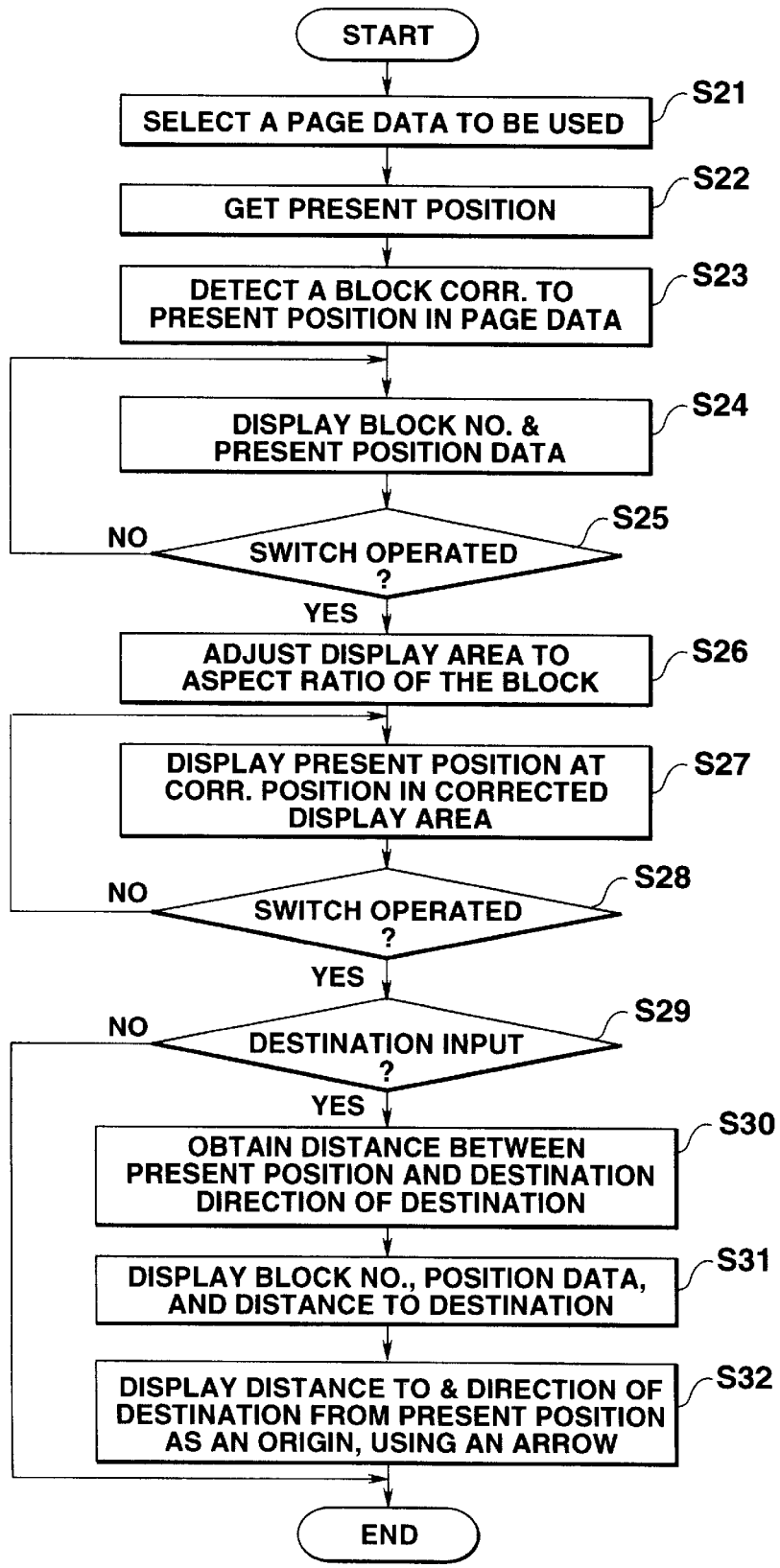

POSITION DATA DISPLAY/CONTROL APPARATUS AND METHODS

BACKGROUND OF THE INVENTION

The present invention relates to position data display/control apparatus and methods which use position data received from GPS (Global Positioning System) satellites to display data on the present position.

A GPS is an accurate navigation system which selects at any position on the earth four ones from a plurality of artificial satellites which move around the earth, receives signals from those selected artificial satellites and obtains data on a latitude and longitude of that position on the earth. This GPS constitutes a single built-in navigation aiding apparatus by which an airplane can navigate anywhere in the world and accurate position data is obtained at once, so that the number of airplanes can increase secondarily in one air route, advantageously.

The GPS is further used in each of other fields of navigation of ships/automobiles, control of services of vehicles such as taxis/trucks, map/building measurement, fish finding, leisure activities such as fishing/mountain climbing, study and sciences such as diastrophism, earthquake prediction, etc.

For example, in the navigation of an automobile using a GPS, a present position of the automobile is indicated on a map displayed usually on a display for the user's benefits. Maps in various countries in the world are produced based on respective different techniques for expressing the spherical earth in a plane map, and different geodetic systems different in elements including a central point in making a map. Thus, when a geodetic system is set in the conventional GPS, the user selects a required geodetic system from among preset ones in the whole world, and sets it to correct the position indication accurately. In addition, also when the present position is set to reduce an initial position measuring time, the user inputs data on the latitude and longitude of the user's present position.

As described above, when the latitude and longitude of the user's position measured by the GPSs are adjusted to those of a corresponding position in a map, the user is required to select a required geodetic system from among many preset ones in the whole world and to set it. Thus, the user is required to perform many key-in operations to locate the desired geodetic system, which is a problem to operability of the GPS.

Also, when the user's present position is set to reduce the initial position measuring time, the user is required to input data on the latitude and longitude of the user's present position. Thus, the user is required to beforehand know a rough latitude and longitude of the user's present position and further required to input numerical values of the latitude and longitude one by one, which is also a problem to the operability of the GPS.

SUMMARY OF THE INVENTION

It is an object of the present invention to provide a position information display/control apparatus and method in which the user selects the nearest area to the user's present position from among main areas (countries, cites, local areas) of the world whose various information is preset to perform various setting and other required operations to improve the operability of the apparatus.

In order to achieve the above object, the present invention provides a position data display/control apparatus comprising:

receiving means for receiving position data;

storage means containing area data including in corresponding relationship a plurality of name of areas and a plurality of data on measurement of positions of the areas;

area name selecting means for selecting any particular name of area from among the plurality of names of areas of the area data contained in the storage means; and converting means for converting position data received by the receiving means to position data suitable for measurement of a position of the area whose particular name is selected by the area name selecting means on the basis of data on measurement of the position of that area.

Another object of the present invention is to provide a position data display/control apparatus and method which displays a map which the user can recognize the user's present position rapidly without being influenced by a display area concerned, and a recording medium which contains a computer readable program which causes a computer to control display of a map to allow the user to recognize the present position rapidly.

BRIEF DESCRIPTION OF THE DRAWINGS

FIG. 6 is a flow chart of operation of a GPS in a second embodiment;

FIG. 7 illustrates the user's operation at steps S11 and S13 of FIG. 6;

FIG. 15 illustrates an arrangement of image numbers;

FIG. 19 schematically illustrate a plurality of groups of map books;

FIG. 20 is a flow chart of a process performed by a CPU in the fourth embodiment.

DESCRIPTION OF THE PREFERRED EMBODIMENTS

Preferred embodiments of a position information display/control apparatus according to the present invention will now be described next in detail with the accompanying drawings.

(First Embodiment)

A GPS 1 as a first embodiment of a position information display/control apparatus according to the present invention will be described with reference to FIGS. 1–5.

Figures 1, 2:
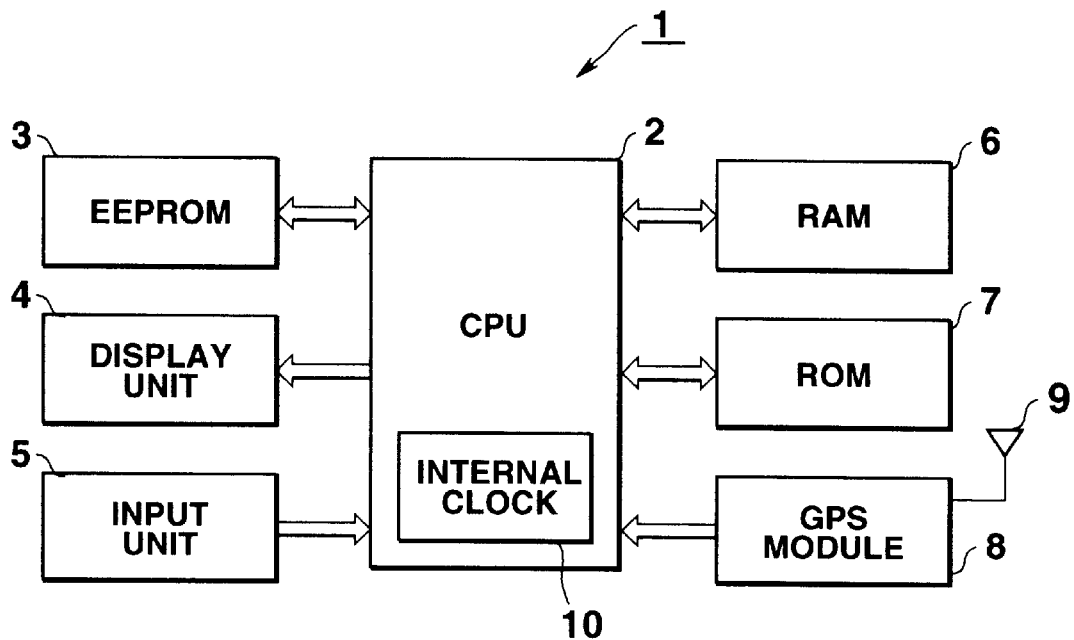
FIG. 1 is a block diagram of a GPS of an embodiment of the present invention.
FIG. 2 illustrates the composition of area data stored in an EEPROM 3 of FIG. 1.

FIG. 1 is a block diagram of the GPS 1 which includes a CPU 2, an EEPROM 3, a display unit 4, an input unit 5, a RAM 6, a ROM 7 and a GPS module 8 with an antenna 9.

The CPU 2 stores in a program storage area of the RAM 6 an application program specified from among various ones including a system program stored in the ROM 7, operates the input unit 5 to store inputted various instructions/data into the RAM 6, performs various processing operations in accordance with the input instruction/data and the application program stored in the RAM 6, stores the result of its processing in the RAM 6 and displays it also on the display unit 4.

In accordance with the user's operation on the input unit 5, the CPU 2 selects the nearest city to the user's present position selects a "city name" corresponding to the selected city from a city data area 3a in the EEPROM 3, reads a "time difference", a "latitude, longitude", and a "geodetic system" corresponding to the selected "city name", from corresponding areas 3b, 3c and 3d and sets those read data in the RAM 6. Then, the CPU 2 predicts or calculates when GPS satellites pass over the user's present position on the basis of a time indicated by a system clock based on an internal clock 10, the set "latitude, longitude" data, and satellite orbit data preset in the EEPROM 3.

When the CPU 2 catches at least one GPS satellite as a result of the prediction or calculation, it receives a UTC (Universal Time Coordinated) signal received from each of he caught GPS satellites and its orbit data, calculates an accurate local time at the user's present position based on the received UTC signal and the set "time difference", appropriately correct the set "latitude, longitude" based on the received orbit data, and then catches other GPS satellites sequentially. When the CPU 2 catches a required number of GPS satellites, it transfers data on the set "geodetic system" to the GPS module 8 and displays on the display unit 4 the latitude and longitude of the user's present position transferred from the GPS module 8.

The city data area 3a provided in the EEPROM 3 which contains preset data on city names, time differences, latitudes, longitudes, and geodetic systems.

FIG. 2 illustrates the composition of the area data which includes preset data on a plurality of groups of "No.", "city name", "time difference", "latitude, longitude" and "geodetic system", designated by 3x, 3a, 3b, 3c and 3d, respectively, as mentioned above. The user can enter data other than the preset data into the area data as requested.

The "No." represents a serial number of each data. The "city name" represents a respective one of main cities in the world. The user can enter a new city name as requested. The "time difference" represents data indicative a time difference of a local time of a city set in the "city name" from the GMT (Greenwich Mean Time). By comparing the "time difference" data with a UTC signal received from a GPS satellite, using the GPS module 8, the user can calculate a local time of the user's present place.

The "latitude, longitude" represent those of the position of the city set in the "city name" corresponding thereto. When measurement of the latitude and longitude of the user's present place is started by the GPS 1, a GPS satellite which can be caught from the user's present place cannot be specified if the user's present place cannot be specified. Thus, the user is required to analyze data received from one of the GPS satellites, using the GPS 1, while gradually specifying the user's place, which requires much time.

If the user can set a standard of the latitude and longitude of the user's present place in an acceptable error with a predetermined GPS satellite which the user can catch, the user can specify a GPS satellite cathcable from user's present position on the basis of the set latitude and longitude and the present time (obtained from the internal clock) because the orbit of the GPS satellite is fixed for a long time, and the user can thus reduce a time requited for catching the desired GPS satellite.

The "geodetic system" represents that of a city set in the "city name". A map of each of countries in the world is created based on a geodetic system of that country. Thus, in order to suit data on the present position measured by the GPS 1 to the latitude and longitude of the present position in the map, data on the measured present position is required to be converted to a corresponding latitude and longitude of a geodetic system involving an area which contains the present position. For example, in Tokyo, a map has been created based on a Tokyo geodetic system, using a Bessel ellipsoid coordinate system which uses as its center or an origin of the latitude and longitude of Azabudai, Minato-ku, Tokyo. When the "city name" is "Tokyo", the corresponding "geodetic system" is "Tokyo geodetic system".

The display unit 4 includes a CRT or a liquid crystal display which displays various data received from the CPU 2.

The input unit 5 includes various keys such as a power source key, numerical keys, cursor keys, a setting key, an enter key which provide corresponding operation signals to the CPU 2.

The RAM 6 includes a storage area which temporality stores various programs and data operated by the CPU.

The ROM 7 contains a system operating program, various application programs for the GPS 1 and a measuring program for a GPS module 8 which are selectively read out in accordance with an instruction from the CPU 2.

The GPS module 8 calculates a local time of a city contains the user's present position, on the basis of a UTC signal received from a GPS satellite via the antenna 9, and a time difference for a city name preset in the EEPROM 3. It converts latitude and longitude data based on data received from the GPS satellite to those of a geodetic system of the city involving the user's present position.

Operation of the GPS 1 will be described next with reference to FIG. 3. First, the CPU 2 selects the nearest city to the user's present position in accordance with data input by the user at the input unit 5, selects a corresponding "city name" from the city data area 3a in the EEPROM 3 (step S1), and then reads a "time difference", a "latitude, longitude", and a "geodetic system" corresponding to the selected "city name" from the corresponding areas 3b–3d, and sets them in the RAM (step S2).

Figure 4:
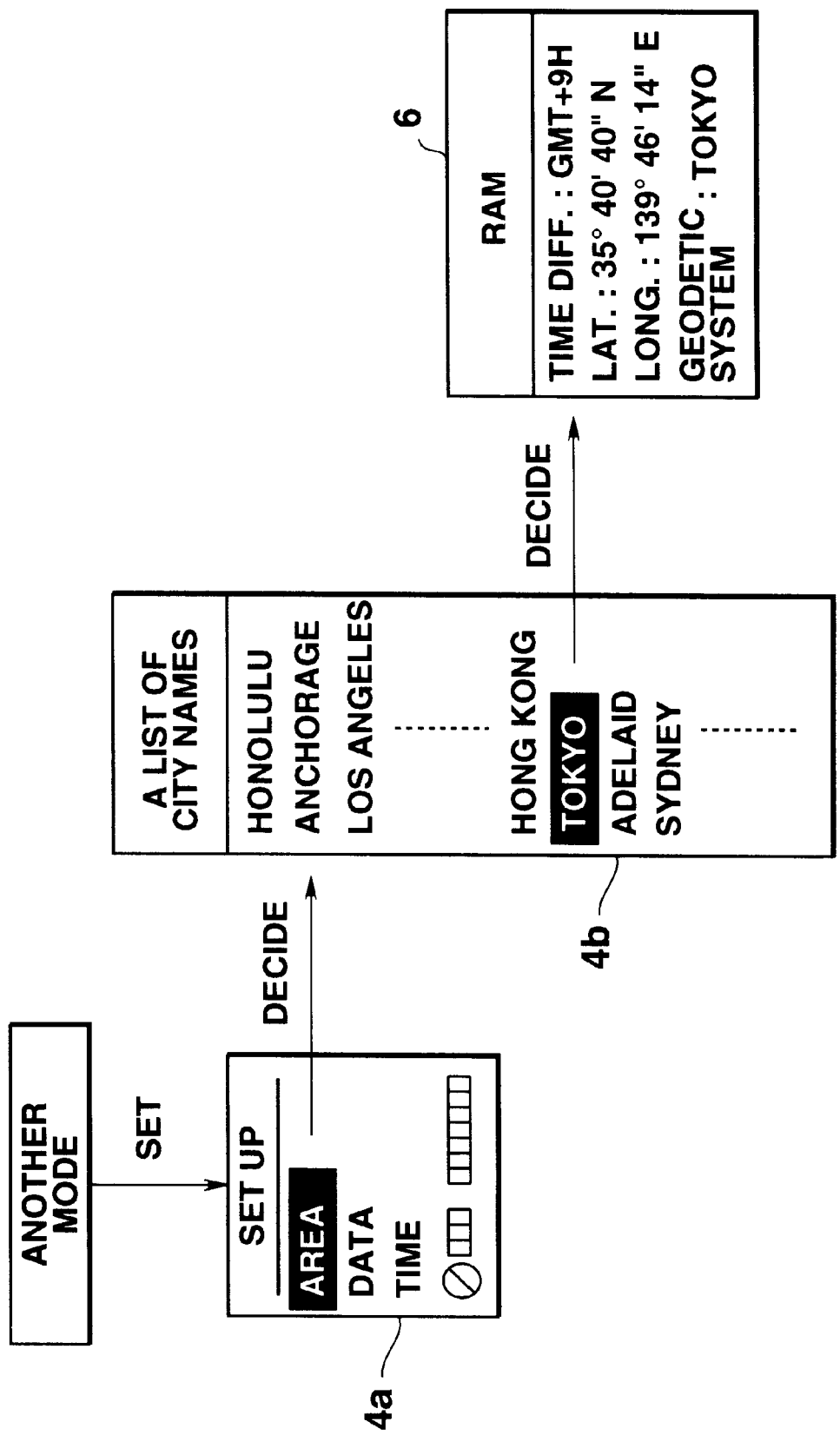
FIG. 4 illustrates a user's operation at steps S1 and S2 of FIG. 3.

The user's operations performed at steps S1 and S2 will be described in more detail with reference to FIG. 4. In FIG. 4, when the user depresses a set key of the input unit 5 to select a set mode, the CPU 2 reads and starts up a set mode program stored in the ROM 7, and displays a set picture 4a on the display unit 4. Then, to set the user's present position, the user operates cursor keys of the input unit 5 to select an "area" and then depresses an enter key, the CPU 2 reads the area data stored in the EEPROM 3, and displays on the display unit 4b a city list picture 4b representing a list of cities set in the "city name" column.

Further, for example, when the user operates the cursor keys on the city list picture 4b to select "Tokyo" in FIG. 4 and then depresses the enter key, the CPU 2 reads from the EEPRO 3 "time difference", "latitude, longitude" and "geodetic system" corresponding to "Tokyo" in the "city name" of the city data area 3a and sets them in the RAM 6. In FIG. 4, "GMT+9" (Greenwich Mean Time+9 hours) is set as data corresponding to "Tokyo", "LAT. 35°40'40"N" and "LONG. 139°46'14"E" are set in the latitude and longitude columns, respectively, and "Tokyo" is set in the geodetic system column (step S2).

Then, the CPU 2 predicts or calculates when GPS satellites pass over the user's position based on the present time indicated by the internal clock 10, the set latitude and longitude data, and satellite orbit data preset in a satellite orbit data area 3y in the EEPROM 3 (step S3).

When the CPU 2 catches at least one GPS satellites, it receives UTC and orbit data received from the GPS satellite, calculates an accurate local time of the user's present position based on those data, appropriately corrects the set latitude and longitude based on the received orbit data, and then catches the next required GPS satellites sequentially (step S4). In order to fix the latitude and longitude of the user's present position on the earth, it is necessary to catch three GPS satellites. In order to fix the latitude and longitude and height of the user's present position on the earth to obtain the user's three-dimensional position, it is necessary to catch four GPS satellites. A necessary number of GPS satellites are required to be caught depending on use.

When the CPU 2 catches the required number of GPS satellites at step S4, it transfers the set "geodetic system" data to the GPS module 8, which converts the "geodetic system" data to the CPU 2 to data on a latitude and longitude in a geodetic system involving the user's present position, on the basis of the transferred "geodetic system" data and the data received from the caught satellite, and then transfers the last-obtained latitude and longitude data to the CPU 2 (step S5). The CPU 2 displays the latitude and longitude of the user's present position received from the GPS module 8 on the display unit 4 (step S6), and then terminates this process.

Figure 5:
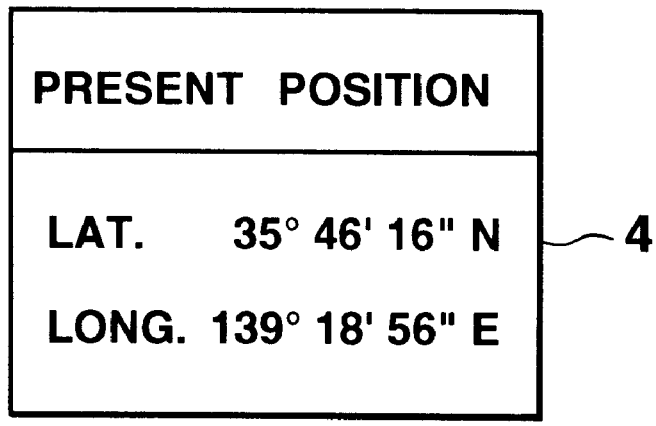
FIG. 5 illustrates the user's present position displayed on a display unit at step S5 of FIG. 3.

FIG. 5 shows the user's present position displayed on the display unit 4 and representing LAT. 35°46'16"N and "LONG. 139°18'56"E" obtained by correcting the latitude and longitude of FIG. 4 set as its initial value.

As described above, according to the GPS 1 as the first embodiment, the CPU 2 selects the nearest city to the user's present position in accordance with the user's operation on the input unit 5, selects a "city name" corresponding to the selected city from the area data 3a in the EEPROM 3, reads from the data areas 3b–3d "time difference", "latitude, longitude", and "geodetic system" data corresponding to the selected "city name", and sets those data in the RAM. Then, the CPU 2 calculates or predicts when GPS satellites pass over the user's present position on the basis of the present time indicated and recorded by the internal clock 10, the set "latitude, longitude" data, and satellite orbit data preset in the EEPROM 3.

When the CPU 2 catches at least one GPS satellite, it receives UTC and orbit data from the caught GPS satellite, calculates an accurate local time of the user's present position based on the received UTC data and the set "time difference", appropriately corrects the set "latitude, longitude" based on the received orbit data while catching other GPS satellites sequentially. When the CPU 2 catches a required number of GPS satellites, it transfers data on the set "geodetic system" to the GPS module 8 and displays on the display unit 4 the latitude and longitude of the user's present position transferred from the GPS module 8.

Thus, the user is only required to select the nearest city to the user's present position when the initial setting operation is performed at the start of the position measurement in a state where data on the main cities in the world are preset, and is not required to individually input data on a time difference of the user's present position from the GMT and the latitude, longitude and geodetic system of the user's present position. Thus, the user's data inputting operation is simplified to improve the operability of the GPS 1.

(Second Embodiment)

Figure 8:
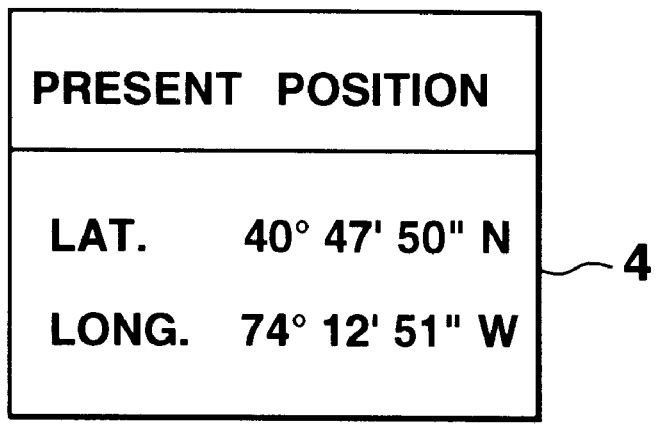
FIG. 8 illustrates the user's present position displayed on the display unit at step S17 of FIG. 6.

Referring to FIGS. 6–8, a GPS 1 as a second embodiment of the inventive position information display/control apparatus will be described next. When a plurality of geodetic systems are set for one city in this GPS 1, it contains as typical values only a latitude and longitude of a WGS (World Geodetic System) 84 which is typical of geodetic systems in the world without containing longitudes and latitudes of the respective geodetic systems to thereby reduce the size of the preset data. The composition of the GPS 1 in this embodiment is the same as that of the first embodiment, and further description thereof will be omitted.

FIG. 6 is a flow chart of operation of the GPS 1 of the second embodiment. In operation, first, the CPU 2 selects the nearest city to the user's present position and a "city name" corresponding to the city from the city data area 3a in the EEPROM 3 in accordance with the user's operation at the input unit 5 (step S11), selects a "geodetic system" from the data area 3c in the EEPROM 3 in accordance with the user's operation at the input unit 5 (step S12), and then reads from the data areas 3b, 3c a "time difference", and "latitude, longitude" data corresponding to the selected "city name", and sets them in the RAM (step S13).

The user's operating process performed at steps S11 and S13 will be described in more detail with reference to FIG. 7. In FIG. 7, when the user depresses a set key of the input unit 5 to select a set mode, the CPU 2 reads and starts up a set mode program stored in the ROM 7, and displays a set picture 4a on the display unit 4. Then, to set data on the user's present position, the user operates the cursor keys of the input unit 5 to select an "area" and then depresses the enter key, the CPU 2 reads the area stored in the EEPROM 3, and displays on the display unit 4 a city list picture 4c representing a list of cities set in the "city name" column.

Further, when the user operates the cursor keys in the city list picture 4c to select, for example, "New York" in FIG. 7 and then depresses the enter key, the CPU 2 displays on the display unit 4 a list of geodetic systems 4c corresponding to the city name "New York".

When the user further operates the cursor keys in the list of geodetic systems 4c to select, for example, "North America 1927" in FIG. 7 and then depresses the enter key, the CPU 2 reads "time difference", and "latitude, longitude" corresponding to the city name "New York" from the EEPROM 3 and sets them in the RAM 6.

In FIG. 4, for example, "GMT–5H" (Greenwich Mean Time minus 5 hours) is set in the "time difference" column as data corresponding to "New York". "Lat. 40°46'00" N" and "Long. 73°54' 00" W" are set in the "latitude, longitude" columns. The selected "North America 1927" is set in the "geodetic system" column. Note that in this case the set "latitude, longitude" are actually not those of the "North America 1927" selected as the "geodetic system", but those of the WGS 84 as typical ones selected temporarily.

After data on the "time difference", the WGS 84, and its "latitude, longitude" are set at step S13, the CPU 2 transfers those data to the GPS module 8 (step 14). The GPS module 8 converts those data to data on the geodetic system selected by the user, the related latitude, longitude data, and transfers the thus obtained data to the CPU 2 (step S15).

Figure 3:
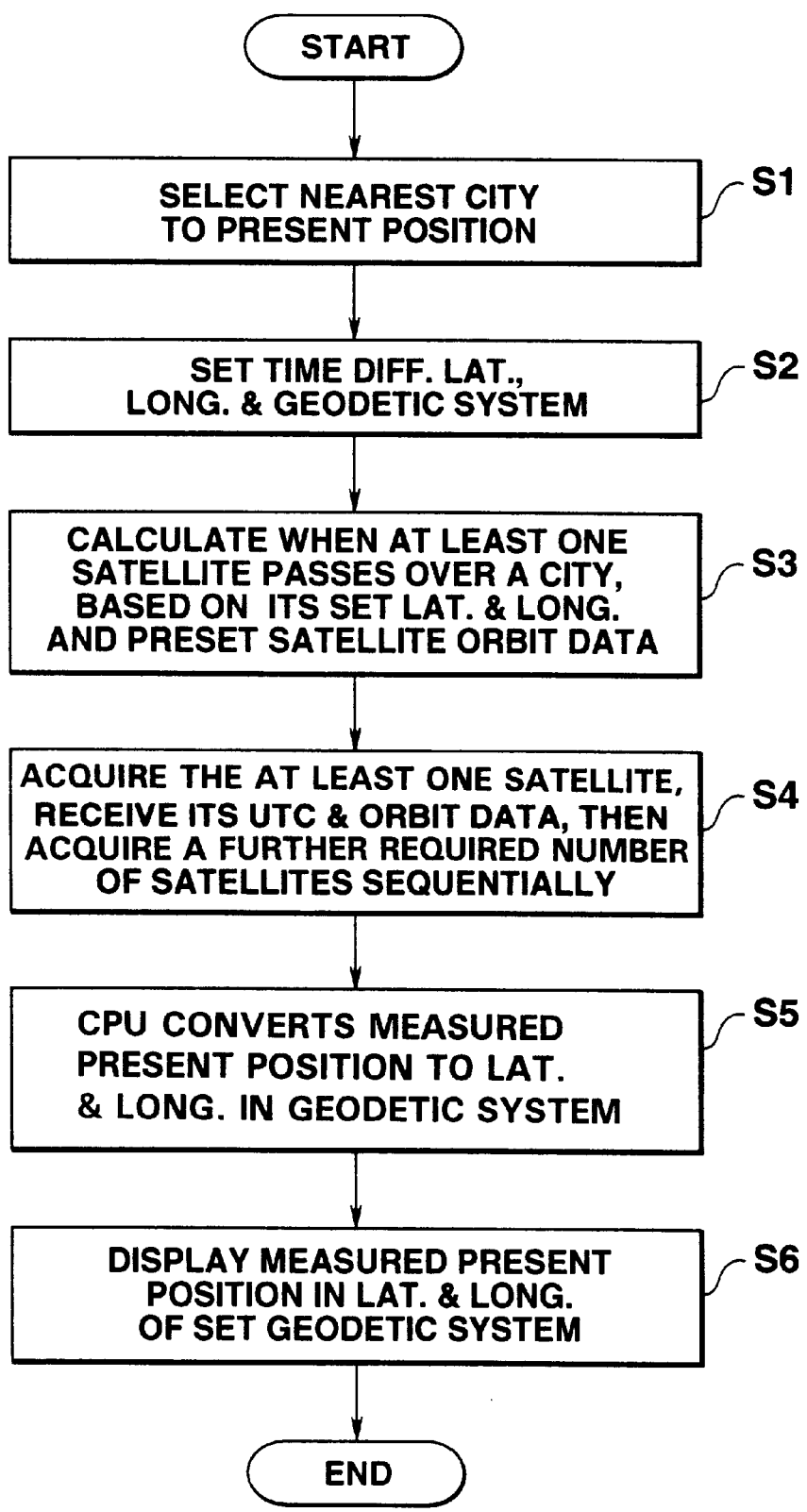
FIG. 3 is a flow chart of operation of the GPS 1 of FIG. 1.

The CPU 2 performs a GPS satellite catching process (step S16), which is similar to a group of steps S3–S5 of the FIG. 3 flow chart of the first embodiment, on the basis of the "latitude, longitude" (now in the geodetic system of "North America 1927" in the example of FIG. 7) and "time difference" converted and transferred by the GPS module 8.

That is, the CPU 2 calculates or predicts when GPS satellites pass over the user's position based on the present time indicated by the system clock based on the internal clock, the converted latitude and longitude data, and satellite orbit data preset in the EEPROM 3. When the CPU 2 catches at least one GPS satellites over the user's present position, it receives UTC and orbit data received from that GPS satellite, calculates an accurate local time of the user's present position based on those data, appropriately corrects the last-set latitude and longitude based on the received orbit data, and then catches other GPS satellites sequentially.

When the CPU 2 catches a required number of GPS satellites, it delivers the set "geodetic system" data to the GPS module 8, which converts the geodetic system data to latitude and longitude data in a geodetic system involving the user's present position on the basis of the geodetic system data and the received GPS satellite data involving the user's present position in the WGS 84, and provides the last-mentioned data to the CPU 2. The CPU 2 displays on the display unit 4 the latitude and longitude of the user's present position in the selected geodetic system received from the GPS module 8 (step S17), and then terminates this process.

FIG. 8 shows, for example, the user's present position displayed at step S17 on the display unit 4 as "Lat. 40°47' 50" N" and "Long. 74°12' 51" W" (of "North America 1927") obtained by accurately correcting in the selected geodetic system data on the latitude and longitude in the WGS 84 of FIG. 7 set as the initial values.

As described above, according to the GPS 1 as the second embodiment, in accordance with the user's operation on the input unit 5, the CPU 2 selects the name of the nearest city to the user's present position from the area data 3*a* in the EEPROM 3, selects a "geodetic system", and then reads from the data areas 3*b*–3*d* data on a "time difference", and a "latitude, longitude", a "geodetic system" corresponding to the selected "city name", and sets those data in the RAM. 6.

The CPU 2 then transfers those data to the GPS module 8. The GPS module 8 converts the received data to the latitude and longitude data of the selected geodetic system, and transfers the last-mentioned data to the CPU 2. The CPU 2 then performs a GPS satellite catching process similar to that of the first embodiment based on the transferred "latitude, longitude" and "time difference".

Thus, even when a city registered as preset data in the RAM 6 has a plurality of geodetic systems, only a latitude and longitude of the WGS 84 is preset which is typical of the geodetic systems without presetting the respective latitudes and longitudes of all the geodetic systems. The GPS module 8 converts the latitude and longitude of the WGS 84 to those of the selected geodetic system data, so that a quantity of data to be preset is small, which serves to reduce the size of the preset data, to utilize a storage capacity of the EEPROM 3 effectively, and to reduce the user's trouble to input and register unpreset city data.

While in the GPSs 1 of the first and second embodiments the plurality of city names are registered and the nearest city to the user's present position is selected, and various required setting steps are performed, nation's names and their local area names may be registered instead.

While in the first and second embodiment, conversion of a geodetic system in the GPS 1, using GPS satellites, has been illustrated, correct time setting/position adjustment, for example, may be performed based on various position data received from a beacon and a communication system of FM multiplexing broadcasting, excluding GPS satellites.

As described above, in the present embodiment, the position data display control apparatus comprises:

receiving means for receiving position data;

storage means containing area data including in corresponding relationship a plurality of name of areas and a plurality of data on measurement of positions of the areas;

area name selecting means for selecting any particular name of area from among the plurality of names of areas of the area data contained in the storage means; and converting means for converting position data received by the receiving means to position data suitable for measurement of a position of the area whose particular name is selected by the area name selecting means on the basis of data on measurement of the position of that area.

According to the position data display control apparatus, the storage means contains area data including in corresponding relationship a plurality of name of areas and a plurality of data on measurement of positions of the areas. When the area name selecting means selects any particular name of area from among the plurality of names of areas of the area data contained in the storage means, the converting means converts position data received by the receiving means to position data suitable for measurement of a position of the area whose particular name is selected by the area name selecting means on the basis of data on measurement of the position of that area.

In the particular embodiment, a position information display control method comprises the steps of: selecting a name of area from area data which includes a plurality of names of areas and a plurality of data on measurement of positions of those areas stored in corresponding relationship; and converting received position data to that suitable for measurement of a position of the area of the selected name based on the data on measurement of a position of that area.

Thus, by registering data on main areas in the world beforehand in the area data, an area which contains the user's present position is only required to be selected in the initial setting operation performed at the start of the measurement, and no other various setting operations to correctly measure the user's present position are required. Thus, the corresponding user's data inputting operation is eliminated and the user's trouble to be taken in the position measurement is reduced.

The receiving means receives position data from a GPS satellite, the storage means also contains as the area data a plurality of geodetic systems of the areas in corresponding relationship to the plurality of names of areas, the converting means converts the position data received from the GPS satellite to position data based on a one of the plurality of geodetic systems corresponding to the particular name of area selected by the area name selecting means.

According to the particular embodiment, the position information display control method comprising the steps of: selecting a name of area from area data which includes a plurality of names of areas and a plurality of geodetic systems stored in corresponding relationship; and converting position data received from a GPS satellite to position data based on a geodetic system corresponding to the selected name of area.

Thus, by registering data on main areas in the world beforehand in the area data, an area which contains the user's present position is only required to be selected in the initial setting operation performed at the start of the measurement, and no other various setting operations to correctly measure the user's present position are required. Thus, the corresponding user's data inputting operation is eliminated and the user's trouble to be taken in the position measurement is reduced.

In the particular embodiment, the area data further includes a plurality of time differences of the areas from a world standard time, and a plurality of latitudes and longitudes of the areas in corresponding relationship to the plurality of names of areas; and further comprising:

local time calculating means for calculating a local time of the area whose name is selected by the area name selecting means based on the time difference of that area from the world standard time; and specifying means for specifying a GPS satellite catchable in the area based on a latitude and longitude corresponding to that area and the local time of that area calculated by said calculating means, the receiving means receiving position data from the GPS satellite specified by the specifying means.

According to the particular embodiment, the area data further includes a plurality of time differences of the areas from a world standard time, and a plurality of latitudes and longitudes of the areas in corresponding relationship to the plurality of names of areas. The local time calculating means calculates a local time of the area whose name is selected by the area name selecting means based on the time difference of that area from the world standard time. The specifying means specifyies a GPS satellite catchable in the area based on a latitude and longitude corresponding to that area and the local time of that area calculated by the calculating means. The receiving means receives position data from the GPS satellite specified by the specifying means.

Thus, when the time difference of the user's present position from the GMT, the latitude and longitude of the user's present position are required to be set to reduce the time required for catching the GPS satellites at the start of the measurement, an area which contains the user's present position is only required to be selected. Thus, the user's trouble to perform a data inputting operation is omitted and operability of the GPS is improved.

According to the particular embodiment, the receiving means receives position data from a GPS satellite, the storage means further contains as the area data a plurality of groups of geodetic systems each group being usable in a respective one of the areas in corresponding relationship to the plurality of name of areas, and further comprising:

geodetic system selecting means for selecting one from the group of geodetic systems corresponding to the name of the area selected by the area name selecting means, the converting means converts the position data received from the GPS satellite to position data based on the geodetic system selected by the area name selecting means.

According to the particular embodiment, the position information display control method comprising the steps of: selecting a name of area from area data which includes a plurality of names of areas and a corresponding plurality of groups of geodetic systems stored in corresponding relationship; selecting any particular geodetic system from among the group of geodetic systems corresponding to the selected name of area; and converting position data received from a GPS satellite to position data based on the selected geodetic system.

Thus, even when an area registered for area data has a plurality of geodetic systems, only the latitude and longitude, for example, of the WGS 84, is set which is typical of the geodetic systems without presetting the respective latitudes and longitudes of all the geodetic systems. The GPS module 8 converts the set latitude and longitude data to that of the selected geodetic system, so that a quantity of data to be preset is small, which serves to reduce the size of the area data, to utilize a storage capacity of the storage device effectively, and to reduce the user's trouble to input and register the area data.

According to the particular embodiment, the area data further includes a plurality of time differences of the areas from a world standard time, and a plurality of latitudes and longitudes of the areas based on a typical geodetic system in corresponding relationship to the plurality of names of areas; and further comprising:

local time calculating means for calculating a local time of the area whose name is selected by said area name selecting means, based on the time difference of the area from the world standard time; and latitude/longitude converting means for converting a latitude/longitude of the area whose name is selected by said area name selecting means, based on a typical one of the plurality of geodetic systems corresponding to that area to a latitude/langitude of that area based on the geodetic system selected by the geodetic system selecting means; and specifying means for specifying a GPS satellite catchable in that area based on the latitude and longitude of that area to which the latitude and longitude converting means has converted the latitude and longitude corresponding to that area and its local time calculated by said calculating means, the receiving means receiving the position data from the GPS satellite specified by said specifying means.

According to the position information display control apparatus, the area data further includes a plurality of time differences of the areas from a world standard time, and a plurality of latitudes and longitudes of the areas based on a typical geodetic system in corresponding relationship to the plurality of names of areas. The local time calculating means calculates a local time of the area whose name is selected by the area name selecting means, based on the time difference of the area from the world standard time. The latitude/longitude converting means converts a latitude/longitude of the area whose name is selected by the area name selecting means, based on a typical one of the plurality of geodetic systems corresponding to that area to a latitude/longitude of that area based on the geodetic system selected by the geodetic system selecting means. The specifying means specifies a GPS satellite catchable in that area based on the latitude and longitude of that area to which the latitude and longitude converting means has converted the latitude and longitude corresponding to that area and its local time calculated by the calculating means. The receiving means receives the position data from the GPS satellite specified by the specifying means.

Thus, when the time difference of the user's present position from the GMT, the latitude and longitude of the user's present position are required to be set to reduce the time required for catching the GPS satellites at the start of the measurement, an area which contains the user's present position is only required to be selected. Thus, the user's trouble to perform a data inputting operation is omitted and operability of the GPS is improved.

Thus, when the time difference of the user's present position from the GMT, the latitude and longitude of the user's present position are required to be set to reduce the time required for catching the GPS satellites at the start of the measurement, an area which contains the user's present position is only required to be selected. Thus, the user's trouble to perform a data inputting operation is omitted and operability of the GPS is improved.

According to the inventive apparatus of this embodiment, well-known nation, city and local area names are registered to facilitate selection of an area as a standard of the user's present position.

According to the present invention, data on main areas in the world are registered beforehand as area data. Thus, when the initial setting operation is performed for starting position measurement, the user is only required to select an area which contains the user's present position, and not required to perform various setting step to correctly measure the user's present position. Thus, the user's trouble to input data for the various setting steps is eliminated and the user's trouble which would otherwise be taken for measuring the user's position is reduced.

According to the present invention, data on main areas in the world are registered beforehand as area data. Thus, when the initial setting operation is performed for starting position measurement, the user is only required to select an area which contains the user's present position, and not required to input geodetic system data used in the map which contains the user's present position. Thus, the user's trouble to input the geodetic system data is eliminated and the user's trouble which would otherwise be taken for measuring the user's position is reduced.

Thus, when the time difference of the user's present position from the GMT, the latitude and longitude of the user's present position are required to be set to reduce the time required for catching the GPS satellites at the start of the measurement, an area which contains the user's present position is only required to be selected. Thus, the user's trouble to perform a data inputting operation is omitted and operability of the GPS is improved.

Thus, even when an area registered for area data has a plurality of geodetic systems, only the latitude and longitude, for example, of the WGS 84, is set which is typical of the geodetic systems without presetting the respective latitudes and longitudes of all the geodetic systems. The GPS module 8 converts the set latitude and longitude data to that of the selected geodetic system, so that a quantity of data to be preset is small, which serves to reduce the size of the area data, to utilize a storage capacity of the storage device effectively, and to reduce the user's trouble to input and register the area data.

Thus, when the time difference of the user's present position from the GMT, the latitude and longitude of the user's present position are required to be set to reduce the time required for catching the GPS satellites at the start of the measurement, the nearest city to the user's present position is only required to be selected. Thus, the user's trouble to perform a data inputting operation is omitted and operability of the GPS is improved.

(Third Embodiment)

Figure 9:
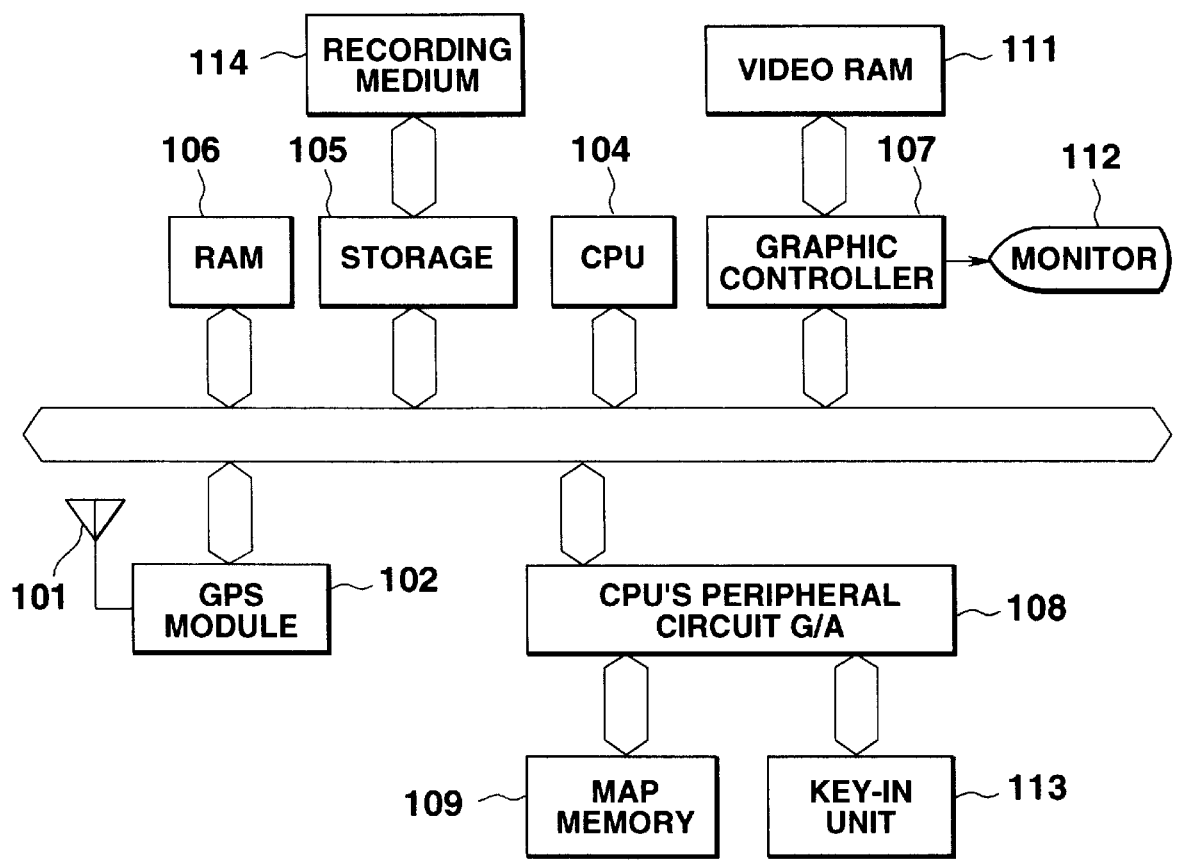
FIG. 9 is a block diagram of a GPS as a third embodiment of the present invention.

A GPS as a third embodiment of the present invention will be described next with reference to the accompanying drawings. FIG. 9 is a circuit diagram of a small handy GPS of the third embodiment. The GPS includes an antenna 101, and a GPS module 102 which demodulates and decodes an L1 band C/A code received via the antenna 101 from a satellite, and obtains a latitude and longitude of the user's present position. The data on the latitude and longitude of the GPS's present position obtained from the module 102 is delivered via a bus 103 to the CPU 104, which is connected to a storage device 105, and a RAM 106 which stores various data required for the operation of the CPU 104 via the respective buses 103.

The storage device 105 includes a recording medium 114 which contains programs and data. The recording medium 114 includes a magnetic or optical recording medium or a semiconductor memory provided fixedly or removably in the storage device 105. The programs/data stored in the recording medium 114 may be received from another device or its recording medium connected via a communication line.

A graphic controller 107 and a CPU peripheral circuit G/A 108 are connected to the bus 103. The peripheral circuit G/A 108 is connected to a map memory 109. The CPU 104 constitutes a control means in the present invention. The CPU 104 reads map data from the map memory 109 via the peripheral circuit G/A 108, and displays a corresponding map/other data on a screen of a monitor 112 based on the map data and image data stored in a video RAM 111. A key-in unit 113 which includes a menu key, cursor keys, an enter key, etc., (not shown) to operate the GPS is connected to the peripheral circuit G/A 108.

Figure 10:
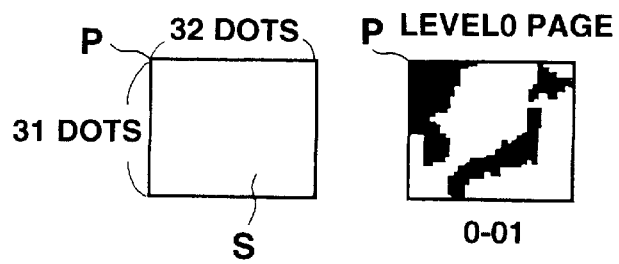
FIG. 10 illustrates a size of a map image area and its image at level 0.

The map memory 109 contains data on map pages of different scales corresponding to respective different enlarging levels 0–4 of FIGS. 10–14. As shown in FIG. 10, each map page has a size displayed on a display area S of 31×32 dots as shown in FIG. 10, and is stored along with data on a latitude and longitude of an upper left-end spot P thereof in the map memory 109. Thus, a latitude and longitude of each of the 31×32 dots of each map page can be calculated based on a scale of a corresponding enlarging level and the latitude and longitude of the spot P of that map.

One map page at level 0 of FIG. 10 has image data of an image number 0-01 and has a scale by which substantially the whole country of Japanese is displayed on the display area S.

Figure 11:
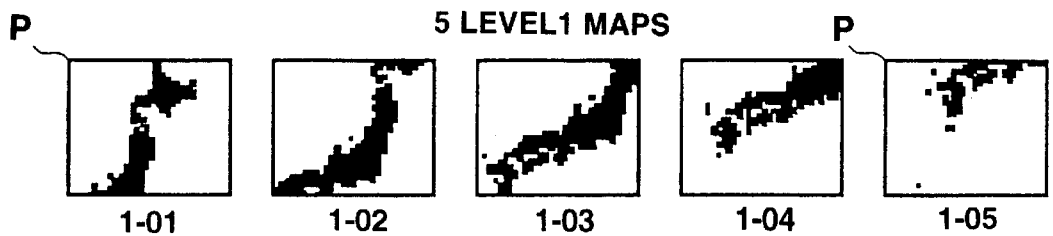
FIG. 11 illustrates map images at level 1.

Five map pages of level 1 of FIG. 11 have image data of image numbers 1-01 to 1-05 each having an enlarged scale compared to the image at level 0, and overlap to display the whole country of Japan.

Figure 12:
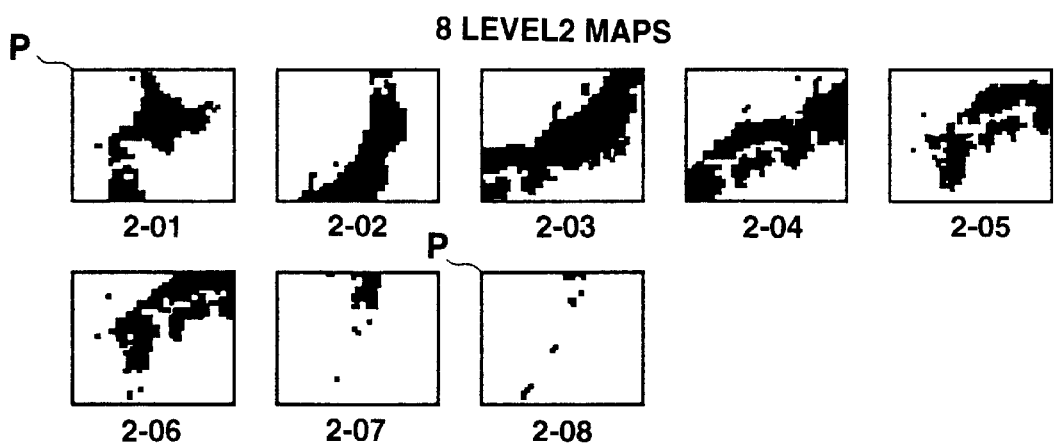
FIG. 12 illustrates map images at level 2.

Eight map pages of level 2 of FIG. 12 have image data of image numbers 2-01 to 2-08 each having an further enlarged scale compared to the image at level 1, and overlap to display the whole country of Japan.

Figure 13:
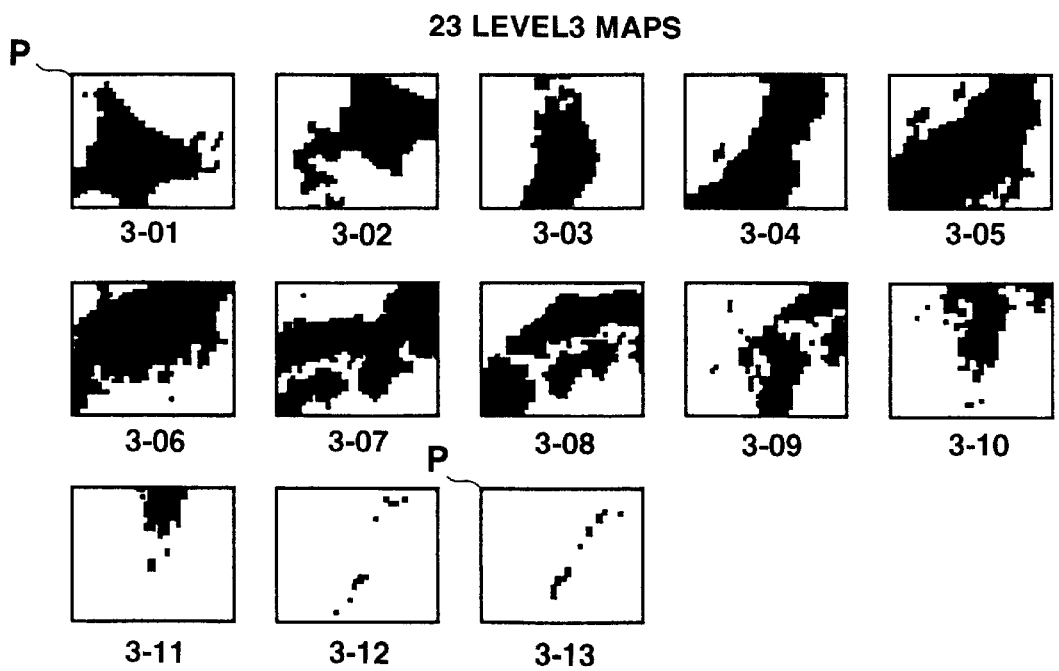
FIG. 13 illustrates map images at level 3.

Similarly, 13 map pages of level 3 of FIG. 13 have image data of image numbers 3-01 to 3-08 each having an further enlarged scale compared to the image at level 2, and overlap to display the whole country of Japan.

Figure 14:
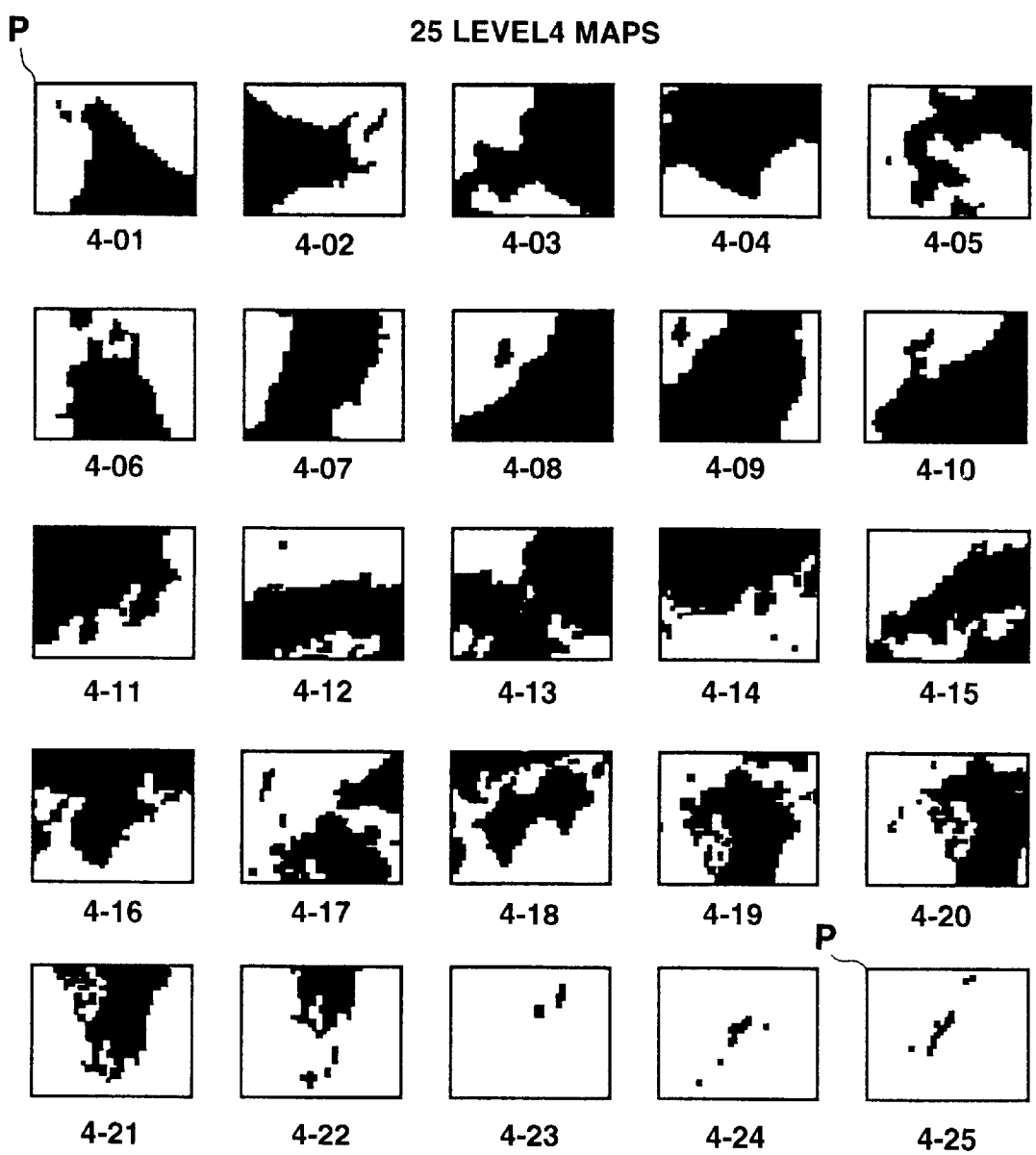
FIG. 14 illustrates map images at level 4.

Twenty five map pages of level 4 of FIG. 14 have image data of image numbers 4-01 to 4-25 each having an further enlarged scale compared to the image at level 3, and overlap to display the whole country of Japan.

As shown in FIG. 15, the map memory 109 also includes an image number storage device which contains a plurality of serial numbers 1–25 and a plurality of groups of image numbers at respective enlarging levels 0–4. Each group of image numbers, shown in FIGS. 10–14, is arranged in order of image or level enlargement for a respective serial number. For example, for a serial number "4", a group of image numbers 0-01, 1-01, 2-01, 3-02, and 4-04 at levels 0, 1, 2, 3 and 4 are contained. When a serial number is specified, images of a group of image numbers corresponding to the serial number are read and displayed sequentially in enlarging order, as described above.

Operation of the GPS of the particular embodiment will be described next with reference to FIGS. 16 and 17A–17E. A control program which fulfils the respective functions indicated by the FIG. 16 flow chart is contained in the form of a CPU readable program code in the recording medium 114. When the user performs a predetermined operation at the key-in unit 113, the CPU 104 instructs the GPS module 102 to measure the user's present position. When the module 102 has measured the user's present position, the module 102 delivers data on a latitude and longitude of the user's present position to the CPU 104 (step SA1).

Then, the CPU 104 retrieves a map image of a picture which contains the delivered latitude and longitude data from 25 pictures for level 4 having image numbers 4-01 to 4-25 of FIG. 14 and sets this map image as such in the RAM (step SA 2).

More particularly, as described above, each map image is contained along with its latitude and longitude data representing a spot P at its upper left-end. A latitude and longitude of each of 31×32 dots of each map image can be calculated based on the scale of each enlarging level and the latitude and longitude of the spot P. Thus, a map image containing that of the 31×32 dots of which corresponds to the latitude and longitude delivered at step SA1 is retrieved from the map images of levels 4-01 to 4-25.

The CPU 104 then selects a serial image number corresponding to the set picture of level 4 (step SA3).

Figure 17A:
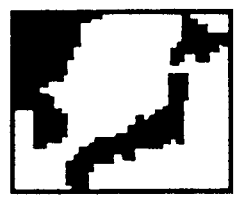
FIGS. 17A–17E illustrate map images disposed sequentially in increasing sizes.

Thereafter the CPU 104 displays on the monitor 12 a map image having an image number of 0-01 at level 0, which represents the smallest scale, selected from the map images, as shown in FIG. 17A (step SA4).

Then, the CPU 104 sequentially displays map images at levels 1-3 corresponding to the selected serial No. (step SA5), and further the picture at level 4 (step SA6).

Figure 17B:
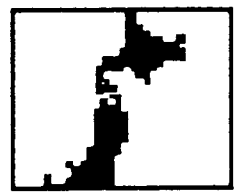
Figure 17C:
Figure 17D:
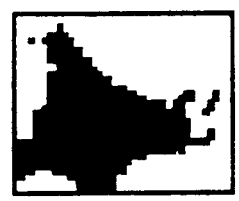

Thus, when, for example, the latitude and longitude data gotten at step S1 is contained in the image number of 4-01, the CPU 104 sets an image number of 4-01 at step S2, and selects a serial No. 1 of FIG. 15 at step SA3. Subsequently, the CPU 104 displays a map image having an image number of 0-01, as shown in FIG. 17A. Then, the CPU 104 sequentially displays map images having Nos. 1-01, 2-01, 3-01 at levels 1, 2, 3 for the serial No. 1, as shown in FIGS. 17B–17D at step SA5.

Figure 17E:

As shown in FIG. 17E, the CPU 104 then displays a map image having an image number of No. 4-01 at step SA6.

Thus, the maps of increasing scales are displayed sequentially, so that the user can easily understand that portion of a Japanese map which the point of FIG. 17E indicates.

When the map of FIG. 17E is displayed abruptly, it is difficult to understand which portion of the Japanese map that map indicates. However, the increasingly enlarged maps of FIGS. 17A–17E are displayed sequentially, so that the user can easily understand the particular map indicated on the largest scale.

At step SA7 subsequent to step SA5, the CPU 104 obtains a dot corresponding to the latitude and longitude of the present position on the displayed picture of level 4. More specifically, the CPU 104 calculates a latitude and longitude of each of the 31×32 dots of the displayed picture of level 4 based on the latitude and longitude of the spot P at the upper left-end of the displayed picture of level 4, and detects a dot corresponding to the latitude and longitude of the present position gotten at step SA1. Then, the CPU blinks the obtained dot to indicate the user's present position, as shown in FIG. 17E (step SA8). At this time, since the map of the maximum scale of FIG. 17E is already recognized, the user can rapidly and clearly recognize the blinking position of the dot P in the map and the user's present position corresponding to the dot.

When in this embodiment display of five enlarging levels 0–4 are illustrated, the number of enlarging levels may increase. The scales of the map and areas involving the respective enlarging levels are not limited to those of the illustrated embodiments, but further enlarged detailed maps may be displayed.

Figure 16:
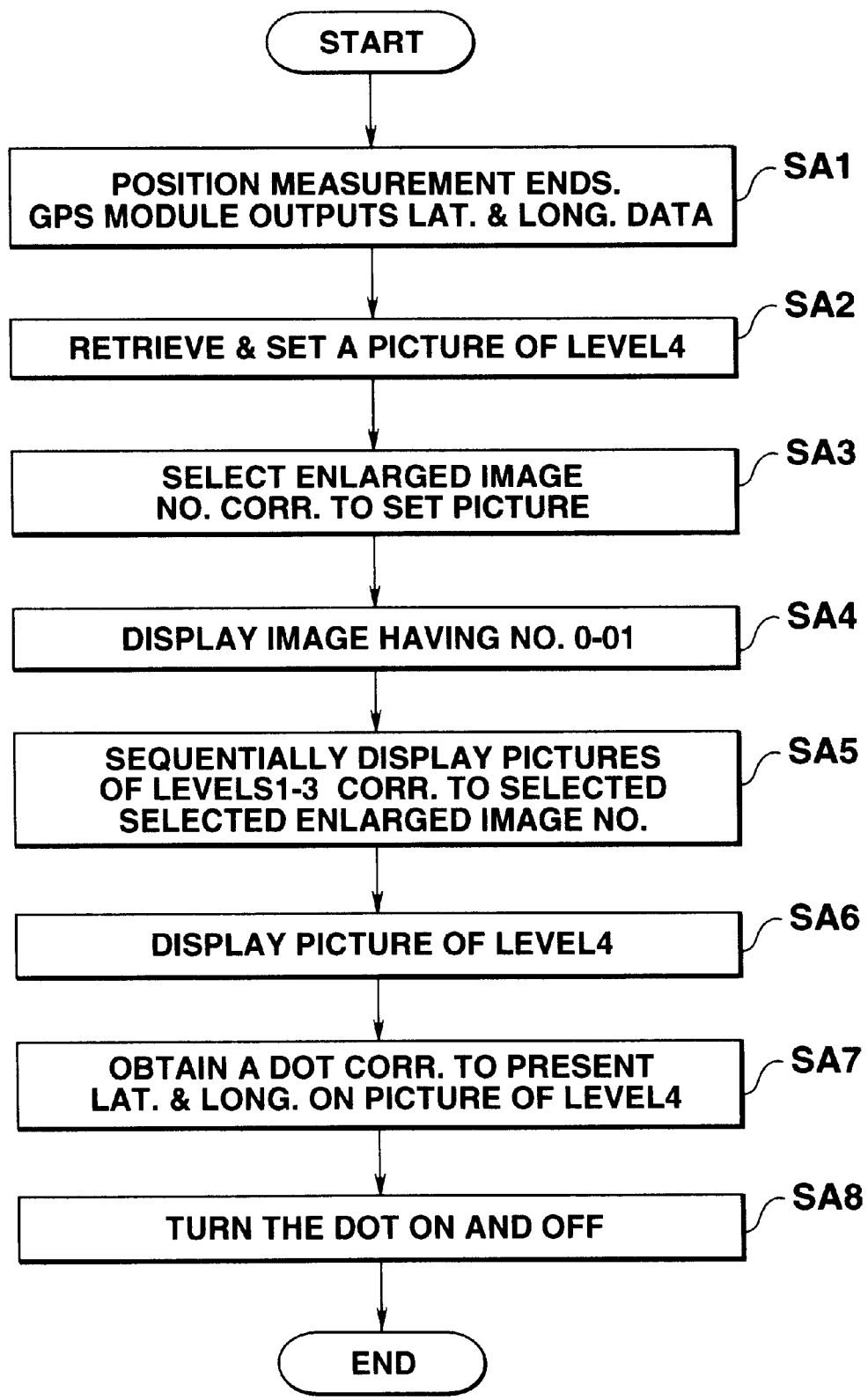
FIG. 16 is a flow chart of a process for indicating the present position.

As described above, in the particular embodiment, as shown in FIGS. 9 and 16, the map display apparatus comprises: display means 12 having a predetermined display area;

present position obtaining means 102 for obtaining a present position; and control means 104 for sequentially enlarging and displaying on said display means a map containing the present position obtained by said present position obtaining means.

Thus, maps of increasing scales are sequentially displayed on the display means having the predetermined display area. Thus, by visually recognizing the maps sequentially, the user can easily understand the present position. As a result, the user can easily and rapidly recognize the present position in the maximum enlarged map.

In the particular embodiment, as shown in FIGS. 9, 16 and 17A–17E, the control means 104 further displays the present position (D of FIG. 17E) obtained by the present position obtaining means 102 on a maximum enlarged map displayed on the display means 112.

Thus, by visually recognizing the maps of increasing scales displayed sequentially on the display means and the present position displayed finally, the user can instantaneously understand the present position. As a result, the user can easily and rapidly recognize the present position geographically in the maximum enlarged map.

In the particular embodiment, as shown in FIGS. 9, 11, 12–16, the map display apparatus further comprises: map data storage means 109 which contains data on a plurality of maps different in scale (FIGS. 11–14); and serial number storage means (FIG. 15) which contains a plurality of serial number numbers for sequentially specifying a corresponding second plurality of maps from the first-mentioned plurality of maps stored in the map data storage means, and wherein the control means 104 selects from the serial number storage means a serial number which specifies a corresponding second plurality of maps to which the present position obtained by the present position obtaining means 102 belongs, and sequentially reads from the map data storage means the maps different in scale specified by the selected serial number, and displays the read maps sequentially on the display means.

Thus, the maps of increasing scales and containing the present position are read and displayed sequentially by the corresponding selected image number. This operation is simple and requires no complicated image processing operation.

In the particular embodiment, as shown in FIGS. 9–14, 16, and 17A–E, the present position obtaining means 102 obtains data on a latitude and longitude of the present position. The map display apparatus further comprises: storage means which contains map data (FIGS. 11–14) whose map is to be displayed on the display means and data on a latitude and longitude of a predetermined position (P of FIGS. 10–14) on the map. The control means calculates the present position on the map displayed on the display means (S7 of FIG. 16) based on a latitude and longitude of the predetermined position on the map and the latitude and longitude of the present position obtained by the present position obtaining means 102, and displays the calculated present position on said display means.

Thus, there is no need to store information on many longitudes and latitudes of respective position in the map. The present position can be obtained only by storing information on a latitude and longitude of one spot or a reduced quantity of information.

In the particular embodiment, as shown in FIG. 16, the control means 104 obtains a dot corresponding to the present position on the map displayed on the display means (S7 of FIG. 16), and displays the dot in a blinking manner (S8 of FIG. 16).

Thus, as in the above just mentioned, the present position can be obtained with reduced stored information, and the position is displayed accurately and clearly by a dot on the map.

In the particular embodiment, as shown in FIG. 16, a map display method comprises the steps of: obtaining a present position (S1); and sequentially enlarging and displaying a map which includes the present position obtained by said obtaining step (S4–S6).

In the particular embodiment, as shown in FIGS. 16, 17A–17E, the map display methods further comprises the step of: displaying the present position (D of FIG. 17E) obtained by the present position obtaining step on a maximum enlarged map (S7 of FIG. 16, FIG. 17E) displayed on the display means.

In the particular embodiment, as shown in FIGS. 9 and 16, a recording medium contains a computer readable program which causes a computer 104 to operate as: present position obtaining means for obtaining a present position (S1 of FIG. 16); and control means for sequentially enlarging and displaying on the display means a map containing the present position obtained by the present position obtaining means (S4–S6).

In this case, the control means further displays the present position (D of FIG. 19E) obtained by the present position obtaining means on a maximum enlarged map (S6 of FIG. 16, FIG. 17E) displayed on said display means.

Thus, by using those map displaying methods or the program recording medium, the area of the maximum enlarged map is easily understand when it is viewed. In addition, since the present position is displayed on the map, its geographical position is recognized instantly.

As described above, in the particular embodiment, the present position obtaining means obtains a present position and control means sequentially enlarges and displays a map containing the present position. Thus, by visually recognizing the maps sequentially and then the maximum enlarged map, the user can easily understand the area indicated by the maximum enlarged map . As a result, even in a map of a small scale containing the present position, the user can easily and rapidly recognize the present position in view of the maximum enlarged map without performing a complicated operation.

Since the control means displays the present position on a maximum enlarged map displayed on the display means. Thus, by visually recognizing the maps of increasing scales displayed sequentially on the display means and the present position displayed finally, the user can instantaneously understand the present position geographically.

The map data storage means contains data on a plurality of maps different in scale and serial number storage means which contains a plurality of serial number numbers for sequentially specifying a corresponding second plurality of maps from the first-mentioned plurality of maps stored in the map data storage means. The control means selects from the serial number storage means a serial number which specifies a corresponding second plurality of maps to which the present position belongs, and displays the read maps sequentially in enlarging order on the display means. Thus, the maps of increasing scales and containing the present position are displayed sequentially in enlarging order at low cost under simple control and in a simple process.

The present position obtaining means obtains data on a latitude and longitude of the present position. The storage means contains data on a latitude and longitude of a predetermined position on the map. The control means calculates the present position on the map displayed on the display means based on the latitude and longitude of the predetermined position on the map and the latitude and longitude of the present position obtained by the present position obtaining means, and displays the calculated present position on the display means. Thus, there is no need to store data on many longitudes and latitudes of respective positions in the map. The present position can be obtained only by storing information on a latitude and longitude of one spot or a reduced quantity of information.

The control means obtains a dot corresponding to the present position on the map displayed on the display means, and displays the dot in a blinking manner. Thus, the present position can be obtained with reduced stored information in a small memory, and the position is displayed accurately and clearly by a dot on the map.

(Fourth Embodiment)

Figure 18:
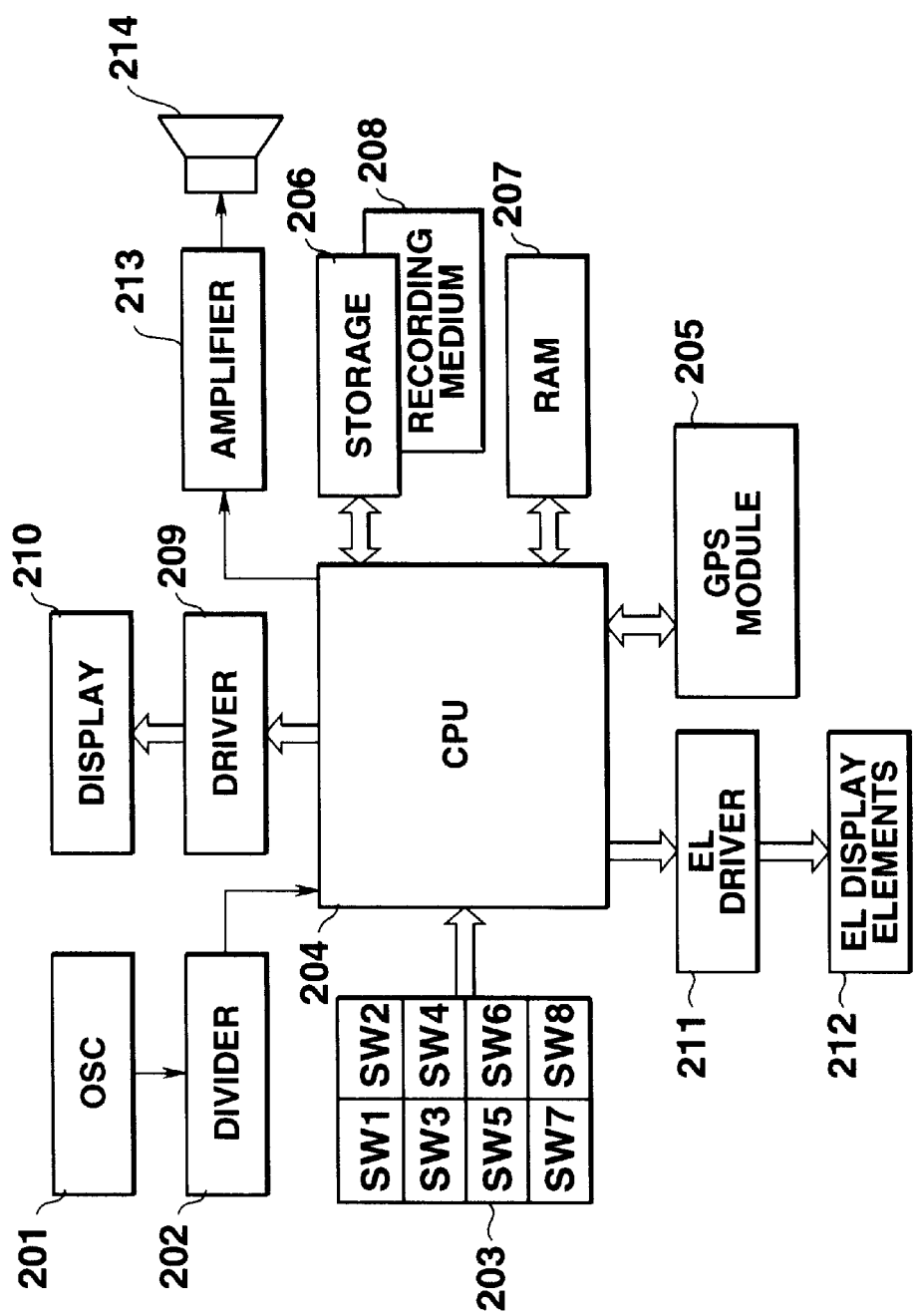
FIG. 18 is a block diagram of a GPS as a fourth embodiment of the present invention.

A handy GPS having a timepiece function as a fourth embodiment of the present invention will be described with reference to the drawings. In FIG. 18, the GPS includes an oscillator 201 which generates a clock signal of a predetermined frequency, a frequency divider 202 which divides the clock signal and a switch unit 203 which includes a plurality of switches SW1–SW8. Signals from the frequency divider 202 and a switch unit 203 are input to a CPU 204.

A GPS module 205 demodulates a C/A code of an L1 band received from a satellite through an antenna (not shown) to obtain data on a latitude and longitude of the user's present position. This position data is then delivered through a bus to the CPU 204, which is connected via buses to a storage device 206 and a RAM 207 which stores various data required for the operation of the CPU 204.

The storage device 206 includes a magnetic or optical recording medium or a semiconductor memory 208 provided fixedly or removably thereon and containing program/data. The program/data contained in the recording medium 208 may be received from a hard disk or recording medium of another device via a communication line.

The CPU 204 is also connected to a display driver 209 which drives a display 210, for example, of a LCD, and an EL driver 211 which drives an EL display element 212 which provides back light for the display 210 for controlling purposes. The CPU 204 generates a voice signal as requested, which is amplified by an amplifier 213 and output from a speaker 214.

In addition to the program/data, the recording medium 208 contains a plurality of groups or map books 215, 216, . . . of pages P1, P2, P3 . . . , as shown in FIG. 19. Data on each of the pages, P1, P2, P3 . . . of each group or map book (each page corresponds to a right and a left open page of a general map book and having successive page numbers) contains data a plurality of equally spaced latitude lines 218 and a plurality of equally spaced longitude lines 219, an aspect ratio of a block 220 defined by any two adjacent latitude lines 218 and any two adjacent longitude lines 219, a plurality of latitude line segments A, B, C, D, E and a plurality of longitude line segments 0, 1, 2, . . . , 7 formed by intersection of the plurality of latitude lines 218 and the plurality of longitude lines 219, and a map scale. An area containing a position to be located, for example, G-3, is specified by a combination of a latitude line segment, for example, G, and a longitude line segment, for example, 3, as in a general map.

Each of the pages P1, P2, P3, . . . also contains data on a latitude and longitude of an upper left-end spot, so that a latitude and longitude of each of dots in that page is calculated based on the latitude and longitude of the upper left-end spot and the scale of a map on that page.

The operation of the GPS of the present embodiment will be described next with reference to a flow chart of FIG. 20. A control program which realizes respective functions shown by the flow chart of FIG. 20 is contained in the form of a computer readable program code in the recording medium 208. When the user confirms his or her present position on a map, the user opens a page of a map book which the user imagines contains the user's position, and keys in data on the kind of the map book and that page at the switch unit 203. In response to this operation, the CPU 204 receives those data and selects page data to be used (step S21). When, for example, a page P1 of the map book 215 is used, the user keys in data on the kind of the map book 215 and page P1, the CPU 204 selects the page P1 of the book 215.

The CPU 204 then instructs the GPS module 205 to measure the user's present position to output data on a latitude and longitude of the user's present position. The CPU 204 then receives the data (step S22). Then, the CPU 204 detects a block corresponding to the user's present position received at step S22 from the page data selected at step S21 (step S23). As described above, each of pages P1, P2, P3, . . . contains data on the latitude and longitude of its upper left-end spot, so that a latitude and longitude of each of all dots in that page is calculatable on the basis of the latitude and longitude of the spot and the map scale. Thus, the CPU 204 detects a block 220 which involves the latitude and longitude of the user's present position, on the basis of the latitude and longitude of the user's present position.

Figure 21A:
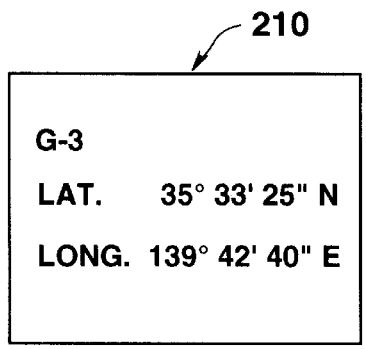
FIGS. 21A–21D show pictures displayed sequentially in the fourth embodiment.

If so, the CPU 204 displays the number of the detected block defined by corresponding latitude and longitude line segments, and the user's present position (step S24), for example, as a block number "G-3", "LAT. 35°33'25" N" and "LONG. 139°42'40" E", as shown in FIG. 21A on the display unit 10. Thus, by finding on the map the area represented by the block number, the user can easily locate the present position on the map.

Figure 21B:
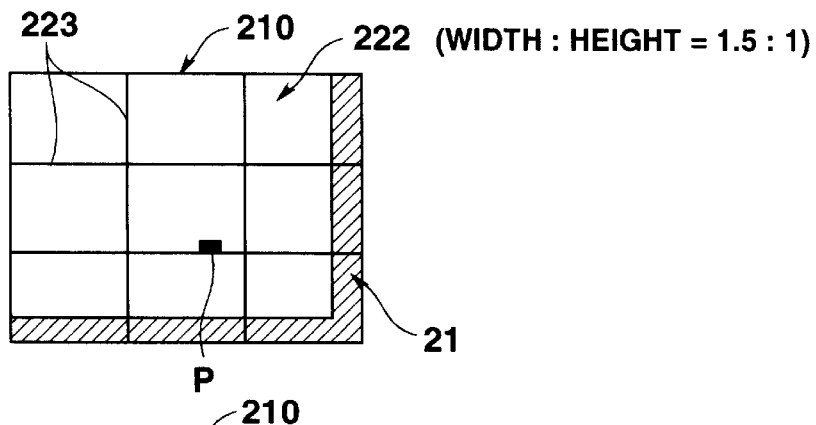

The CPU 204 then determines whether the switch unit 203 is further operated (step S25). If so, the CPU 204 corrects or partially screens the display area on the display unit 10 so as to have an aspect ratio of the block detected at step S23. For example, as in this example, when the block number "G-3" is detected, the aspect ratio of the block which has this block number is 1.5:1. Thus, as shown in FIG. 21B, the CPU 204 displays a dot curtain 221 which covers a right-hand side portion and a lower side portion of the display area so as to provide a display area 222 of the aspect ratio of 1.5:1.

The CPU 204 then displays the user's present position by a point at a corresponding position in the corrected display area (step S27). As described above, since (1) the latitude and longitude of the user's present position is already detected, (2) a latitude and longitude of each of the dots in each block is calculatable, and (3) the display area 222 corresponds to each block, a point representing a latitude and longitude of the user's present position is displayed in the display area 222.

The number "G-3" of the block corresponding to the display area 222 displayed on the display unit 210 is clarified by the display of the FIG. 21A. Thus, by finding a desired point P in the block on the map, the present position is rapidly and accurately specified on the map used. As shown in FIG. 21B, by displaying latitude and longitude lines 223 appropriately on the display 210, the position of the point P in the display area 222 is clarified, so that the corresponding present position on the map is more easily located.

At step S28 subsequent to step S27, the CPU 204 determines whether the switch unit 203 has further been operated. If so, the CPU determines whether data on the latitude and longitude of a destination has been input (step S29). If not, the CPU 204 shifts its control to an end. If so at step S29, the CPU 204 calculates a distance between the user's present position and the destination and a direction of the destination as viewed from the user's present position, on the basis of data on the latitude and longitude of the destination, already gotten data on the latitude and longitude of the user's present position, and the scales of the map (step S210). The direction of the destination as viewed from the user's present position can be calculated, using a spherical trigonometry based on the respective longitudes and latitudes of the present position and destination. The distance between the present position and the destination can be calculated in a similar manner.

Figure 21C:
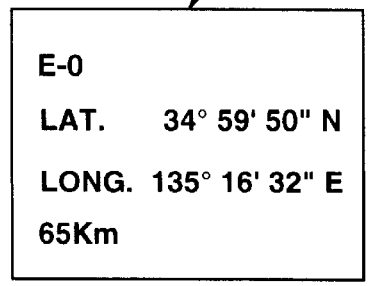

Subsequently, the CPU 204 displays the number of a block to which the destination belongs, its position, the distance from the present position to the destination, for example, as "E-3", "LAT. 34°59'50" N" and "LONG. 139°16'32" E" and "65 Km", as shown in FIG. 21C on the display unit 210 (step S31) Thus, by this display, the user can know the distance from the user's position to the destination without measuring the distance, for example with a compass, on the map, and conjecture the direction of the destination as viewed from the present position can be predicted.

Figure 21D:
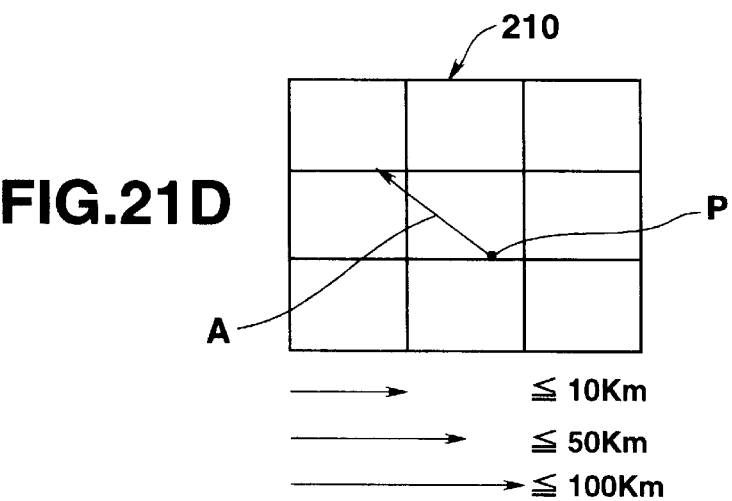

At step S32, the distance between the present position and the destination, and the direction of the destination as viewed from the present position are displayed by an arrow with the present position as an origin, as shown in FIG. 21D. In this case, the length of the arrow A represents the distance between the present position and the destination. The direction of the arrow indicates the direction of the destination. Thus, by viewing the arrow A, the user can recognize the distance between the present position and the destination and the direction of the destination.

In order to aid the user in recognizing the distance by the length of the arrow A, the user is required to beforehand recognize that different lengths of arrows and the corresponding different distances to the destination are displayed, as shown below FIG. 21D, in the transition of FIG. 21C picture to the FIG. 21D one or in the initial picture, or that display may be printed on an instruction manual for the GPS.

While the plurality of groups or map books 215, 216, . . . of map pages are illustrated! as shown in FIG. 19, only one group of map pages may be stored for using purposes.

While in the particular embodiment the groups 15, 16, . . . of map pages are illustrated as being stored, the present invention is not limited to this particular case. For example, by operating the switch unit 203, a latitude and longitude of an upper left end spot of each page, the latitude and longitude line segments, and the aspect ratio of each block may be input instead. In this case, the latitude and longitude of the upper left end spot of the block to which the present position belongs may be displayed whereas in the above the number "G-3" of the block to which the present position belongs is displayed in. FIG. 21A.

As described above, in the particular embodiment, as shown in FIGS. 18–20, a position data display apparatus comprises: display means 210; present position obtaining means 205 for obtaining a present position (S2 of FIG. 20); detecting means (S3 of FIG. 20) for detecting that of areas 220 defined by longitudes and latitude lines 218, 219 printed on a map to which the present position obtained by said present position obtaining means belongs; and display control means (S4 of FIG. 20) for displaying on said display means the area detected by said detecting means.

Thus, by seeing data displayed on the display means, that of areas 220 defined by longitudes and latitude lines 218, 219 on a map to which the present position belongs can be detected. Thus, the present position is easily specified on the map.

In the particular embodiment, as shown in FIGS. 18–20, the display control means 204 further comprises forms on the display means 210 a display area which is identical in aspect ratio to the area (S6 of FIG. 20), and displays the present position as a point P at a position corresponding to the present position in the display area. Thus, the present position in an area defined by the related latitude and longitude lines on the map is instantaneously specified with the point P displayed on the display area.

In the particular embodiment, as shown in FIGS. 18, 19, the position data display apparatus further comprises means (204) for calculating a distance between the present position and a destination whose data is input (S30 of FIG. 20). The display control means 204 displaying on the display means the distance calculated by the calculating means (S32 of FIG. 20).

Thus, the user can know the distance between the present position and the destination without measuring the distance with a compass on the map.

In the particular embodiment, as shown in FIGS. 18–20, the position data display apparatus further comprises means (204) for calculating a direction of the destination as viewed from the present position (S30 of FIG. 20). The display control means 201 displays on the display means the direction of the destination calculated by the calculating means (S32 of FIG. 20, A of FIG. 21D).

Thus, by visually recognizing the display of the display means and the map in corresponding relationship, the user can know the direction of the destination in which the user moves.

In the particular embodiment, as shown in FIGS. 20, 21A–21D, the display control means displays the distance between the present position and the destination, and the direction of the destination with a length and a direction of an arrow (S32 of FIG. 20, A of FIG. 21D).

Thus, by seeing the display of the display means, the user can know the distance to the destination and the direction of the destination.

The inventive position data display method involves the processing steps performed by the present position obtaining means, detecting means, display control means, and calculating means. The inventive program recording medium contains a computer readable program which causes a computer to function as the present position obtaining means, detecting means, display control means, and calculating means.

As described above, in the present invention, the detecting means detects that of areas defined by longitudes and latitude lines on a map to which the present position belongs and the display control means displays on the display means the area detected by the detecting means. Thus, by seeing that area displayed on the display means, the user can know instantaneously the present position in the area. Thus, the present position is easily specified on the map. The point on the map corresponding to the user's present position is easily and rapidly specified.

The display area of the same aspect ratio as the area on the display means is formed and a point on the display area corresponding to the user's present position is displayed. Thus, the point on the map corresponding to the user's present position is easily and rapidly specified.

The distance between the present position and the destination is calculated and displayed, so that the user can know the distance from the present position to the destination without performing a complicated measuring operation on the map. Since the direction of the destination as viewed from the user's present position is calculated and displayed, the direction of the destination in which the user moves is clarified. By displaying the distance between the user's present position and the destination and the direction of the destination with the direction and length of an arrow, the user can clearly recognize at a glance the distance between the user's present position and the destination, and the direction of the destination as viewed from the user's present position.

What is claimed is:

1. A position data display/control apparatus comprising:
    receiving means for receiving present position-data;
    storage means for storing area data comprising a plurality of area names and data for measurement of positions in areas corresponding to the area names;
    area name selecting means for selecting a particular area name which is nearest to a user's present position, from among the plurality of area names of the area data contained in said storage means;
    position data converting means for converting the present position data received by said receiving means to position data suitable for measurement of the user's present position based on the data for measurement of a position in an area corresponding to the area name selected by the area name selecting means; and
    a display/control means for causing a display unit to display the position data converted by the position data converting means as the user's present position.

2. The position data display/control apparatus according to claim 1, wherein said storage means stores as the area data a plurality of area names and geodetic systems corresponding to the plurality of area names, and said position data converting means comprises a converting means for converting the present position data received by said receiving means to position data based on one of the plurality of geodetic systems in the area corresponding to the area name selected by said area name selecting means.

3. The position data display/control apparatus according to claim 2, wherein said area data further includes a plurality of time differences of the areas corresponding to the plurality of area names from a world standard time, and a plurality of latitudes and longitudes of the areas;
    wherein said position data converting means further comprises:

local time calculating means for calculating a local time of the area corresponding to the area name selected by said area name selecting means based on the time difference of that area from the world standard time; and specifying means for specifying a GPS satellite which can be communicated with when measuring the user's present position, based on a latitude and longitude of the area corresponding to the area name selected by said area name selecting means and the local time of that area calculated by said calculating means; and wherein said receiving means receives the present position data from the GPS Satellite specified by said specifying means.

4. The position data display/control apparatus according to claim 1, wherein said storage means stores as the area data a plurality of area names and geodetic systems available in areas corresponding to the area names; and wherein said position data converting means comprises:
geodetic system selecting means for selecting an optimum one of the geodetic systems, corresponding to the area name selected by said area name selecting means; and
a position data changing means for converting the present position data received by said receiving means to position data based on the geodetic system selected by said geodetic system selecting means.

5. The position data display/control apparatus according to claim 4, wherein said area data further includes a plurality of time differences of the areas corresponding to the plurality of area names from a world standard time, and a plurality of latitudes and longitudes of the areas corresponding to the area names based on a typical geodetic system; and wherein said position data converting means further comprises:
local time calculating means for calculating a local time of the area corresponding to the area name selected by said area name selecting means based on the time difference of that area from the world standard time;
latitude/longitude converting means for converting a latitude/longitude of the area corresponding to the area name selected by said area name selecting means, based on a typical one of the plurality of geodetic systems corresponding to that area to a latitude/longitude of that area based on the geodetic system selected by said geodetic system selecting means; and
specifying means for specifying a GPS satellite which can be communicated with when measuring the user's present position, based on a latitude and longitude of the area corresponding to the area name selected by said area name selecting means and the local time of that area calculated by said calculating means; and wherein said receiving means receives the present position data from the GPS satellite specified by said specifying means.

6. The position data display/control apparatus according to claim 1, wherein the area name selected by the area name selecting means is one of a nation, city, and local area name, which is nearest to the user's present position.

7. A position data display/control method comprising:

controlling a storage device that stores area data comprising a plurality of area names and data for measurement of positions in areas corresponding to the area names, and selecting a particular area name which is nearest to a user's present position, from among the plurality of area names of the area data contained in the storage device;

converting present position data received by a receiving device to position data suitable for measurement of the user's present position in an area corresponding to the selected area name, based on the data for measurement of a position in an area corresponding to the selected area name; and controlling a display unit to display the converted position data as the user's present position.

8. A position data display/control method comprising:

controlling a storage unit that stores a plurality of area data comprising a plurality of area names and geodetic systems corresponding to the plurality of area names, and selecting a particular area name which is nearest to a user's present position, from among the plurality of area names of the area data contained in the storage unit;

converting present position data received by a receiving device to position data based on one of the plurality of geodetic systems in an area corresponding to the selected area name; and controlling a display unit to display the converted position data as the user's present position.

9. A position data display/control method comprising:

controlling a storage unit that stores area data comprising a plurality of area names and geodetic systems available in areas corresponding to the plurality of area names, and selecting a particular area name which is nearest to a user's present position, from among the plurality of area names of the area data contained in the storage unit;

converting present position data received by a receiving device to position data of the geodetic system available in an area corresponding to the selected area name; and controlling a display unit to display the converted position data as the user's present position.

* * * * *